US009327873B2

(12) United States Patent
Frankenberg

(10) Patent No.: US 9,327,873 B2
(45) Date of Patent: *May 3, 2016

(54) RIGID URETHANE SELF-SKINNING FOAM TOP FRAME, PALLET SUPPORT BOARD, AND PALLET AND INTEGRALLY FORMED GROMMETS

(71) Applicant: ORBIS Corporation, Oconomowoc, WI (US)

(72) Inventor: Jason Frankenberg, Lake Mills, WI (US)

(73) Assignee: ORBIS Corporation, Oconomowoc, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,327

(22) Filed: Apr. 25, 2014

(65) Prior Publication Data

US 2014/0231429 A1  Aug. 21, 2014

Related U.S. Application Data

(63) Continuation-in-part of application No. 13/290,601, filed on Nov. 7, 2011.

(60) Provisional application No. 61/411,501, filed on Nov. 9, 2010.

(51) Int. Cl.
*B65D 19/00* (2006.01)
*B65D 25/00* (2006.01)
(Continued)

(52) U.S. Cl.
CPC *B65D 25/00* (2013.01); *B65D 1/22* (2013.01); *B65D 19/0002* (2013.01); *B65D 19/0018* (2013.01); *B65D 19/38* (2013.01); *B65D 19/42* (2013.01); *B65D 43/164* (2013.01); *B65D 81/3816* (2013.01); *B65D 81/3823* (2013.01); *B62B 5/0093* (2013.01);
(Continued)

(58) Field of Classification Search
CPC .......... B65D 2519/00034; B65D 2519/00069; B65D 2519/00208
USPC .......... 108/901, 902, 57.25, 51.11; 248/346.02, 346.04, 346.2
See application file for complete search history.

(56) References Cited

U.S. PATENT DOCUMENTS 3,073,274 A * 1/1963 Lamb ............................ 114/266
3,511,191 A * 5/1970 Di Verdi et al. ............ 108/57.28
(Continued)

FOREIGN PATENT DOCUMENTS

CA   2757947 A1   5/2012
DE   3825219 A    2/1990
(Continued)

OTHER PUBLICATIONS

Office Action issued in related Mexican Patent Application No. MX/a/2011/011870, mailed Mar. 2, 2015; English translation not available (2 pages).
(Continued)

*Primary Examiner* — Jose V Chen
(74) *Attorney, Agent, or Firm* — Nixon Peabody LLP

(57) ABSTRACT

A transport item of a body of foamed thermoset material is described having a density that varies across the thickness of the body with the greatest density being proximate an outer surface of the body.

18 Claims, 32 Drawing Sheets

(51) Int. Cl.
- *B65D 19/42* (2006.01)
- *B65D 19/38* (2006.01)
- *B65D 1/22* (2006.01)
- *B65D 81/38* (2006.01)
- *B65D 43/16* (2006.01)
- *B62B 5/00* (2006.01)
- *C08G 101/00* (2006.01)

(52) U.S. Cl.
CPC ...... *B62B 2501/04* (2013.01); *B62B 2501/065* (2013.01); *B65D 2519/00004* (2013.01); *B65D 2519/00034* (2013.01); *B65D 2519/00044* (2013.01); *B65D 2519/00069* (2013.01); *B65D 2519/00079* (2013.01); *B65D 2519/0086* (2013.01); *B65D 2519/0096* (2013.01); *B65D 2519/00268* (2013.01); *B65D 2519/00288* (2013.01); *B65D 2519/00318* (2013.01); *B65D 2519/00467* (2013.01); *B65D 2519/00472* (2013.01); *B65D 2519/00781* (2013.01); *B65D 2519/00791* (2013.01); *B65D 2519/00796* (2013.01); *B65D 2519/00835* (2013.01); *C08G 2101/0025* (2013.01)

(56) References Cited

U.S. PATENT DOCUMENTS

| | | | |
|---|---|---|---|
| 3,581,681 A * | 6/1971 | Newton | 108/57.28 |
| 3,610,720 A | 10/1971 | Hosmer | |
| 3,661,099 A | 5/1972 | Shelor | |
| 3,685,461 A * | 8/1972 | Belcher | 108/57.25 |
| 3,707,929 A * | 1/1973 | Lauffer | 108/57.15 |
| 3,719,157 A | 3/1973 | Arcocha et al. | |
| 3,720,176 A | 3/1973 | Munroe | |
| 3,757,704 A * | 9/1973 | Allgeyer et al. | 108/57.26 |
| 3,814,778 A | 6/1974 | Hashimoto et al. | |
| 3,846,348 A | 11/1974 | Horst et al. | |
| 4,159,681 A * | 7/1979 | Vandament | 108/57.33 |
| 4,230,049 A | 10/1980 | Horne | |
| 4,241,555 A * | 12/1980 | Dickens et al. | 52/454 |
| 4,329,231 A | 5/1982 | Hoffman et al. | |
| 4,440,708 A | 4/1984 | Haataja et al. | |
| 4,467,728 A | 8/1984 | Horne | |
| 4,742,781 A | 5/1988 | Shuert | |
| 4,822,066 A | 4/1989 | Rehrig | |
| 4,824,129 A | 4/1989 | Rehrig | |
| 4,972,611 A | 11/1990 | Swartz et al. | |
| 5,069,358 A | 12/1991 | Avery, Jr. | |
| 5,329,862 A | 7/1994 | Breezer et al. | |
| 5,349,749 A | 9/1994 | Fiedler | |
| 5,401,456 A * | 3/1995 | Alesi et al. | 264/511 |
| 5,413,052 A * | 5/1995 | Breezer et al. | 108/56.1 |
| 5,528,994 A | 6/1996 | Iseli | |
| 5,590,606 A | 1/1997 | Crews et al. | |
| 5,592,885 A | 1/1997 | Young, Jr. et al. | |
| 5,636,577 A | 6/1997 | Gow | |
| 5,687,652 A | 11/1997 | Ruma | |
| 5,829,595 A | 11/1998 | Brown et al. | |
| 5,832,841 A | 11/1998 | Crews et al. | |
| 5,833,207 A * | 11/1998 | Hagenhoff et al. | 108/51.11 |
| 5,921,566 A | 7/1999 | Kern et al. | |
| 6,012,587 A | 1/2000 | McCullough | |
| 6,209,464 B1 * | 4/2001 | Elder | 108/53.3 |
| 6,305,301 B1 | 10/2001 | Piper, Jr. et al. | |
| 6,345,828 B1 | 2/2002 | Pool et al. | |
| 6,357,366 B1 * | 3/2002 | Frankenberg | 108/57.25 |
| D459,049 S * | 6/2002 | Apps et al. | D34/38 |
| 6,420,459 B1 | 7/2002 | Horold | |
| 6,659,020 B1 | 12/2003 | Ball | |
| 6,675,723 B2 | 1/2004 | Sukeva | |
| 6,718,888 B2 | 4/2004 | Muirhead | |
| 6,748,876 B2 | 6/2004 | Preisler et al. | |
| 6,758,148 B2 | 7/2004 | Torrey et al. | |
| 6,928,933 B2 | 8/2005 | Grau | |
| 6,971,518 B1 | 12/2005 | Lowry | |
| 6,974,140 B2 | 12/2005 | Neuman | |
| 6,998,433 B2 | 2/2006 | Overholt et al. | |
| 7,036,833 B1 | 5/2006 | Berna et al. | |
| 7,044,065 B2 | 5/2006 | Arai et al. | |
| 7,066,477 B2 | 6/2006 | Dubois et al. | |
| 7,413,698 B2 * | 8/2008 | Bearse et al. | 264/511 |
| 7,419,457 B1 * | 9/2008 | Sudeith et al. | 482/37 |
| 7,874,256 B2 * | 1/2011 | Muirhead | 108/57.25 |
| 8,141,500 B2 | 3/2012 | Naidu et al. | |
| 8,181,580 B2 * | 5/2012 | Roth et al. | 108/57.25 |
| 8,215,244 B2 * | 7/2012 | Apps | 108/57.25 |
| 8,261,673 B2 | 9/2012 | Ingham | |
| 8,418,632 B2 * | 4/2013 | Linares | 108/55.1 |
| 8,544,648 B2 | 10/2013 | Cleveland et al. | |
| 8,567,324 B1 * | 10/2013 | Paradis et al. | 108/51.3 |
| 2004/0168618 A1 * | 9/2004 | Muirhead | 108/57.25 |
| 2005/0103237 A1 | 5/2005 | Moore et al. | |
| 2006/0011108 A1 | 1/2006 | Abu-Isa et al. | |
| 2008/0149111 A1 * | 6/2008 | Harrison et al. | 128/852 |
| 2009/0116925 A1 | 5/2009 | Juchniewicz et al. | |
| 2012/0111238 A1 | 5/2012 | Frankenberg | |
| 2013/0248674 A1 | 9/2013 | Johnson et al. | |
| 2013/0284635 A1 | 10/2013 | Frankenberg | |
| 2013/0285342 A1 | 10/2013 | Frankenberg | |

FOREIGN PATENT DOCUMENTS

| | | |
|---|---|---|
| EP | 1306312 A1 | 5/2003 |
| EP | 2465784 A2 | 6/2012 |
| FR | 1596011 | 7/1970 |
| WO | 9316927 A1 | 9/1993 |
| WO | 03035495 A1 | 5/2003 |
| WO | 2006071920 A2 | 7/2006 |

OTHER PUBLICATIONS

Wiggins Plastics, Inc.; "Thermosets: Engineering Plastics for Demanding Applications"; retrieved from <http://www.jobshop.com/techinfo/papers/plasticstermpoly.shtml> on Oct. 31, 2014 (2 pages).

"Dura-Ply Pallets"; circular by DS Smith Companies; date unknown (1 page).

European Search Report for EP 02019552 dated Jan. 28, 2003 (4 pages).

Extended European Search Report for EP 11188320.3 mailed Oct. 17, 2012 (15 pages).

International Preliminary Report on Patentability for PCT/CA2011/001230 mailed May 7, 2013 (1 page).

International Search Report for PCT/CA2011/001230 mailed Feb. 13, 2012 (2 pages).

Partial European Search Report for EP 2465784 mailed May 25, 2012 (9 pages).

Written Opinion of International Searching Authority for PCT/CA2011/001230 mailed Feb. 13, 2012 (3 pages).

Holden Plastics Corporation, "Thermosets: Engineering Plastics for Demanding Applications"; retrieved from <http://www.jobshop.com/techinfo/papers/plasticstermpoly.shtml> from Internet Archive Wayback Machine; Mar. 15, 2006 (3 pages).

\* cited by examiner

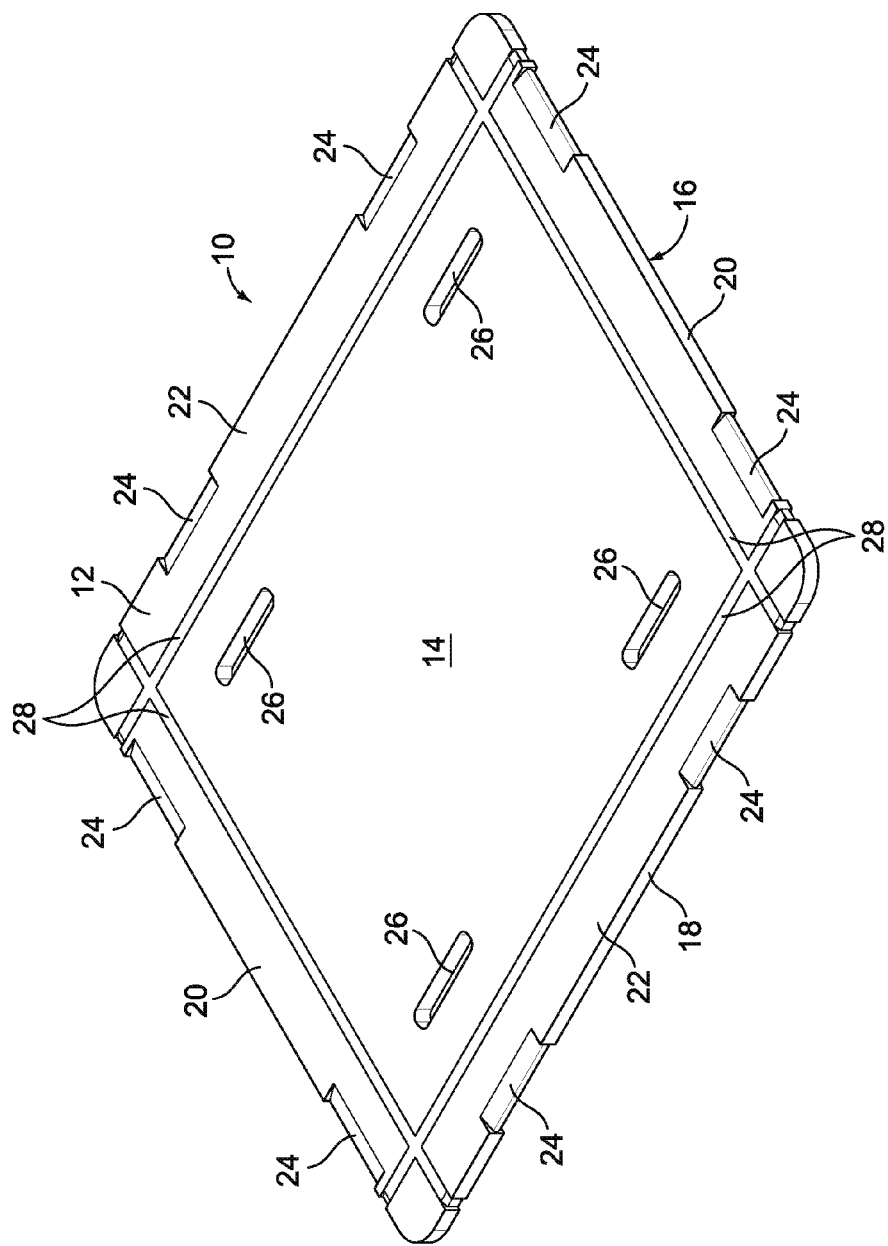

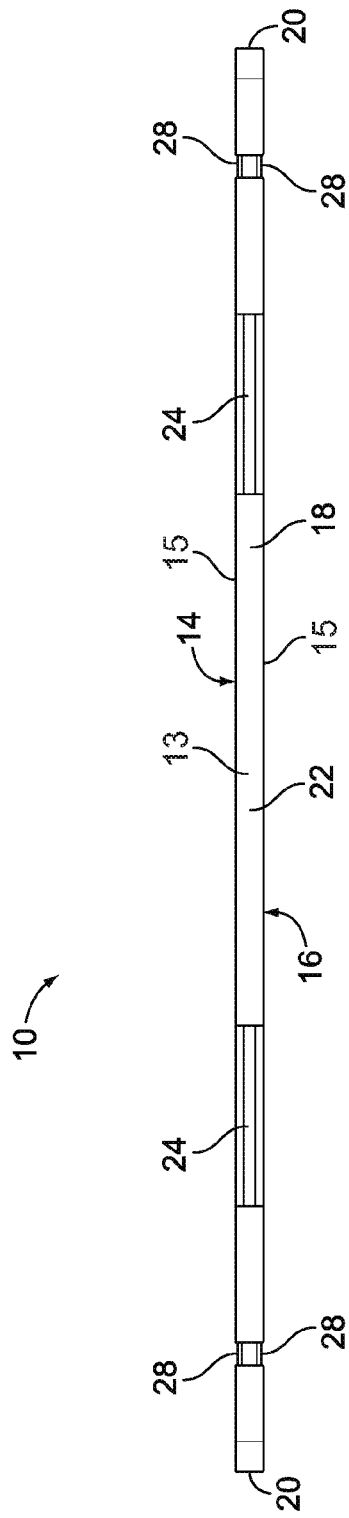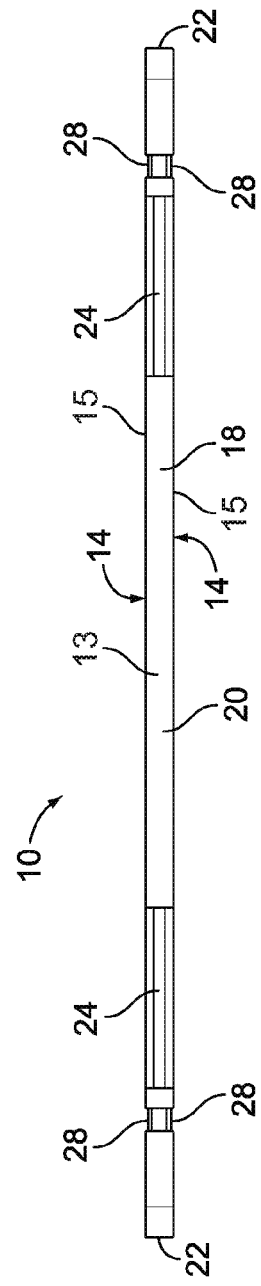

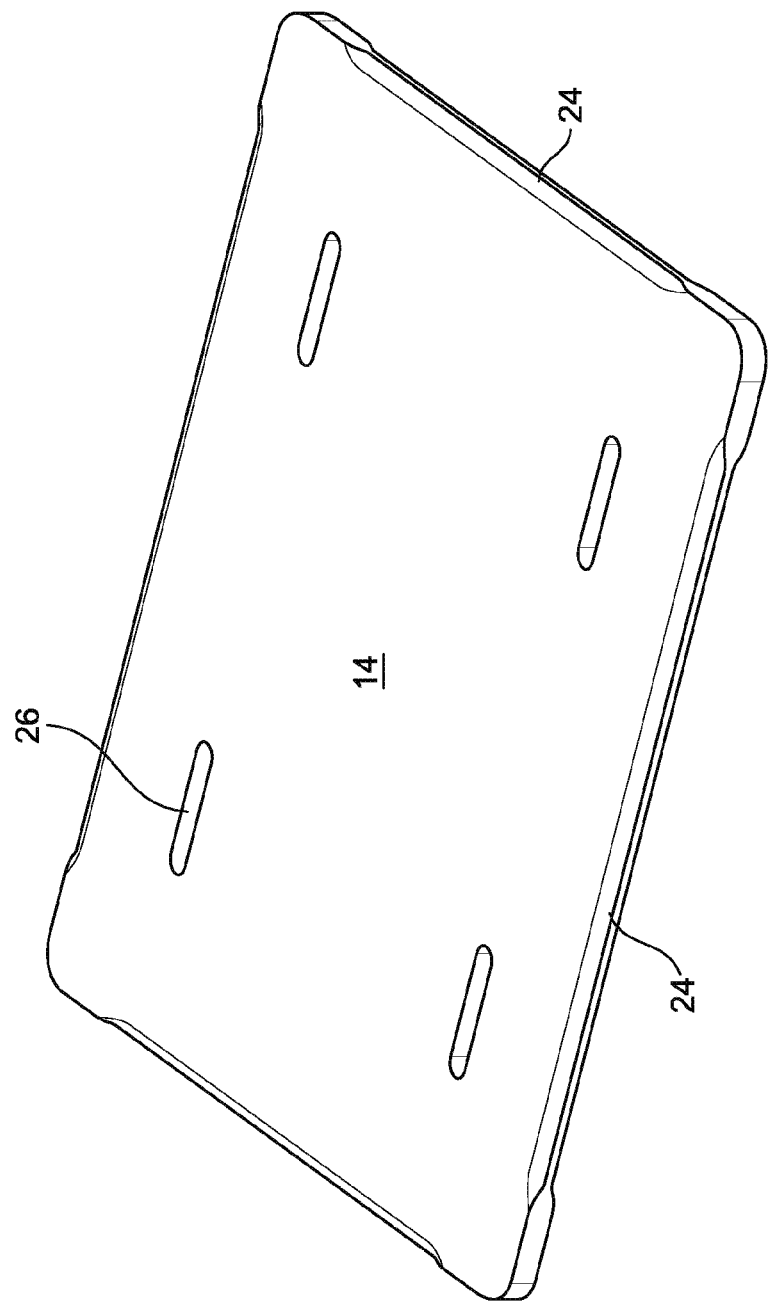

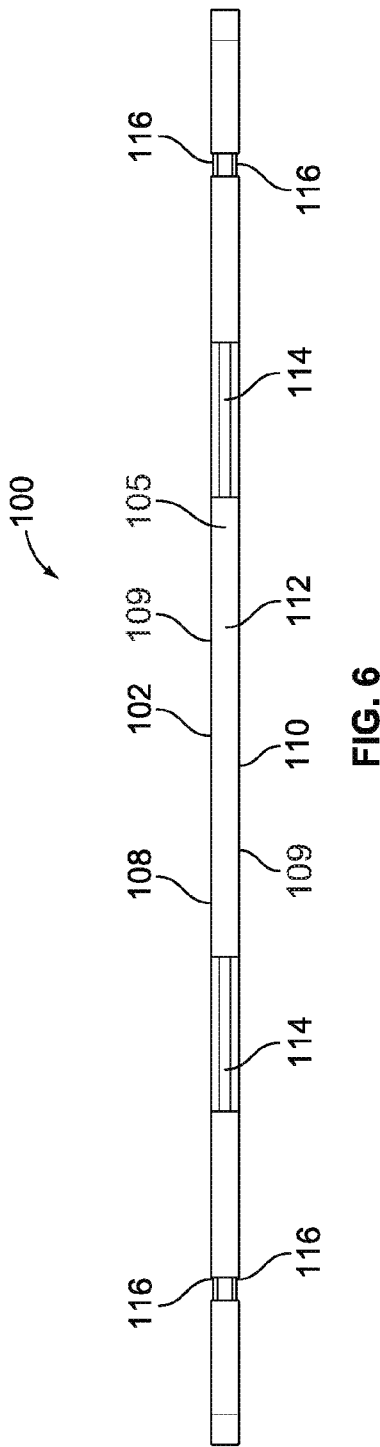
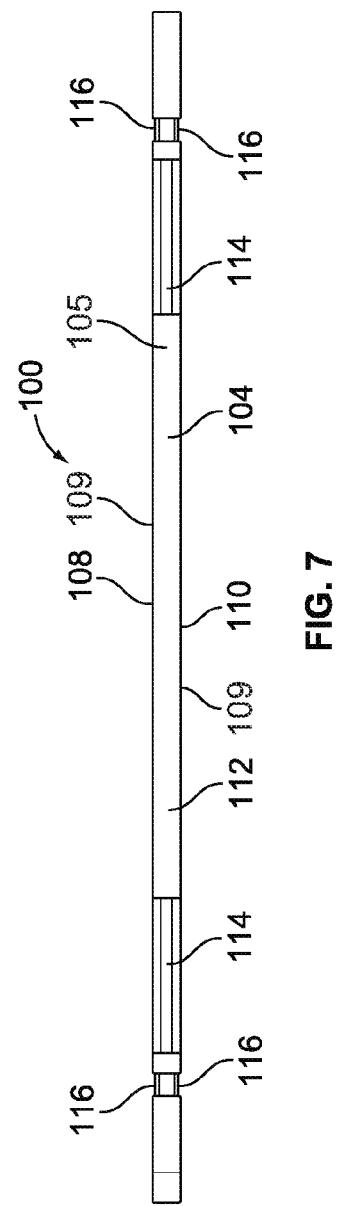

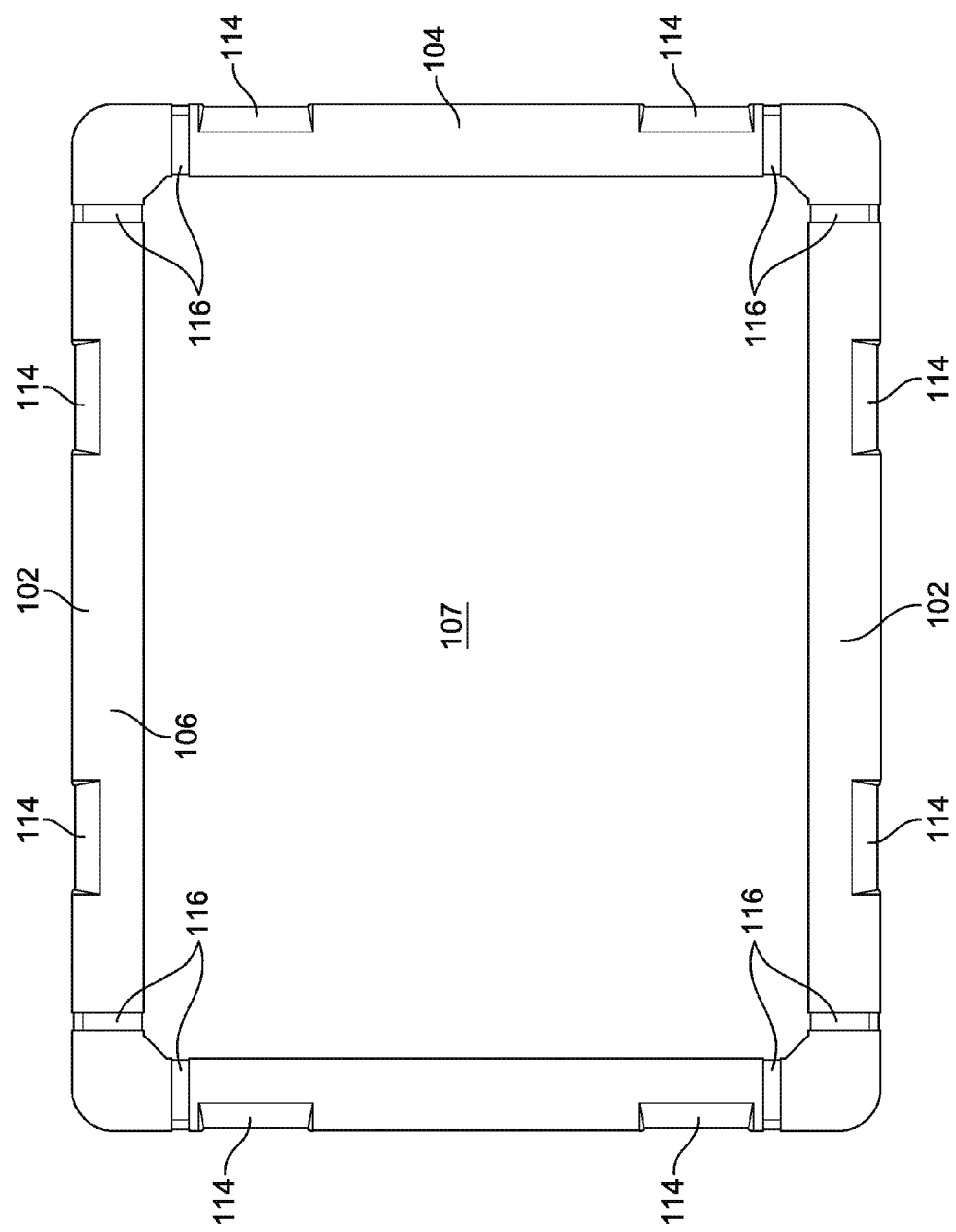

RIGID URETHANE SELF-SKINNING FOAM TOP FRAME, PALLET SUPPORT BOARD, AND PALLET AND INTEGRALLY FORMED GROMMETS

CROSS-REFERENCE TO RELATED APPLICATIONS

The present application is a continuation-in-part of U.S. Non-Provisional application Ser. No. 13/290,601, filed Nov. 7, 2011, which claims the benefit of U.S. Provisional Application No. 61/411,501, filed Nov. 9, 2010, the contents of which are incorporated herein by reference.

FEDERALLY SPONSORED RESEARCH OR DEVELOPMENT

Not applicable.

FIELD OF THE INVENTION

The present invention generally relates to an improved top frame, pallet support board, pallet, dolly, insulated tote, and other related transport items, and a material and process for making the same. The present invention also relates to an insertable component such as a grommet, caster, latch, gasket, or other component formed in such items.

BACKGROUND OF THE INVENTION

Plastic pallets have long been used to transport and store goods and other materials. Plastic top frames have been used with the plastic pallets to secure a load of goods or materials to the pallet. The frames allow for placement of bands or straps around the pallet and goods to prevent the load from slipping on or falling off the pallet.

The load is placed on the pallet, and the top frame is placed on top of the load. The load is then secured to the pallet by wrapping straps or banding around the pallet, the load, and the top frame. The banding can be plastic, metal or other suitable material. The top frame can also facilitate stacking of pallets during transport or storage.

Additionally, plastic pallet support boards have been used to allow pallets of different sizes to be more easily handled. For example, a warehousing operation may employ different sized pallets to move or store goods or materials. The different sized pallets are placed on pallet support boards to facilitate handling in a more standardized manner. Some users place goods or materials directly on the pallet support boards. Known plastic pallets can be heavy. Known plastic pallets, pallet support boards, and top frames are also more expensive than their wooden counterparts.

Plastic dollies are used to move materials from one place to another. Plastic dollies have casters to allow loads to be placed upon the dolly and more easily move the load from place to place. Known dollies are made from a thermoplastic material, and are roto-molded, making them hollow. Dollies made this way are subject to breakage due to use and abuse. These dollies are also heavy and expensive to manufacture.

Totes are currently sometimes used to carry materials requiring temperature control. This requires the materials to be placed in insulated bags, and the bags placed inside the totes. Also, closed cell extruded polystyrene foam (Styrofoam) containers are sometimes used as are steam chest molded containers. Items are placed in the Styrofoam containers, which are then placed inside the totes. Styrofoam containers do not stand up to repeated use. Also it is difficult to wash such containers leading to potential biohazards.

Many of the prior transportation and storage components used in the industry have one or more problems. Some are formed with expensive and/or heavy materials, such as thermoplastic. Others are formed from wood or fiberboard, which can crack or rot. Some use multiple extruded pieces which require additional assembly and risk becoming loose (e.g., a top frame formed from extruded top frame arms connected by corner pieces). Others have hollow portions that can become contaminated if cracked.

Thermoset plastic pallets, dollies, totes, top frames, and pallet support boards can have outer surfaces with a low coefficient of friction. The low coefficient of friction for such surfaces can cause items placed on the surfaces to slide or shift. The low coefficient of friction also can cause stacked pallets, top frames, dollies, totes, and pallet support boards to slide or shift with respect to each other. The present invention is an improvement on all of these as it eliminates or significantly reduces the sliding and shifting by increasing the coefficient of friction of the outer surfaces, thus allowing the product to be used in traditional material handling environments such as with forklifts, palletizers, and conveyors.

SUMMARY OF THE INVENTION

The present invention relates to an improved pallet, top frame, pallet support board, dolly, insulated tote, and other similar items formed from a thermoset foam material. The thermoset foam material provides sufficient strength characteristics while being lightweight and easy to handle.

In one embodiment, a top frame made from a thermoset foam material is provided. The top frame includes a pair of substantially parallel sides and a pair of substantially parallel ends connected to the sides to form a generally rectangular frame structure. The frame structure has an inner layer and an outer surface. The frame structure also has a thickness. The top frame is made from a thermoset foam material. The thermoset foam material varies in density along the frame structure thickness such that the density of the thermoset foam material is greatest nearest the outer surface to form a hard outer shell.

In another embodiment, the top frame for use in combination with a transport item, such as a pallet, carrying goods is provided. The top frame includes a unitary frame formed from a thermoplastic foam having an interior foam portion and an exterior surface foam portion. The interior foam portion has a first foam density. The exterior surface foam portion has a second foam density greater than the first foam density. The exterior foam portion forms a hard skin surrounding the interior foam portion.

In another embodiment, a pallet support board made from a thermoset foam material is provided. The pallet support board includes a generally rectangular deck having an inner layer and an outer surface defining a thickness. Again, the thermoset foam material varies in density along the pallet support board thickness such that the density of the thermoset foam material is greatest near the pallet support board outer surface to form a hard outer shell.

In a further embodiment, a pallet made from a thermoset foam material is provided. The pallet includes a deck having an inner layer and an outer surface defining a thickness. Similar to the top frame and pallet support board, the thermoset foam material varies in density along the pallet thickness such that the density of the thermoset foam material is greatest near the pallet outer surface to form a hard outer shell. In other embodiments, the top frame, pallet support board, and pallet include a substrate coated with a polyurea material.

In another embodiment a tote made from a thermoset foam material is provided. The tote includes a pair of opposing side walls and a pair of opposing end walls. It also includes a lid having a first side and a second side. The tote includes a liner. The liner is sized and shaped to be inserted into the tote. The tote also includes a cover to be placed on top of the liner, and still allow the lid to completely close. The lid can be attached to the tote in other suitable ways, such as hinges.

In a further embodiment a dolly made from a thermoset foam material is provided. The dolly has includes a body. The body includes a caster at each corner. The body includes an elevated edge and an opening in its center.

In a still further embodiment, the present invention provides a top frame. The top frame has first and second substantially parallel sides, and first and second substantially parallel ends connected to the first and second sides to form a generally rectangular frame structure with a central opening. The frame structure has an inner layer and an outer surface, and a thickness. The top frame is made from a thermoset foam material, the thermoset foam material varying in density along the frame structure thickness such that the density of the thermoset foam material is greatest nearest the outer surface to form a hard outer shell.

The pallet support board, top frame, pallet, tote, and dolly can be made of a "self-skinning" foam. Alternatively, such items may also have a generally uniform density throughout their thickness. Additionally, insertable components such as grommets, reinforcements, hinges, casters, gaskets may be similarly formed in the pallet support board, pallet, tote, and dolly.

Thermoset foam is lighter and less expensive than its plastic counterparts in the manufacture of pallets, top frames, or pallet support boards and other related components. Moreover, thermoset materials do not have the memory or "creep" inherent in thermoplastics, rather the material keeps its shape when heated and over extended use. Additionally, such items made according to the present invention are made of a single piece.

In a further embodiment, the present invention provides a transport item for shipping goods. The transport item includes a body having first outer surface and a second outer surface, and a thickness therebetween. The body is formed from a thermoset foam material. The transport item also includes a first insertable component having a first portion located within the thickness of the body and a second portion that extends outside of the body beyond the first outer surface.

Other features and advantages of the invention will be apparent from the following specification taken in conjunction with the following Figures.

BRIEF DESCRIPTION OF THE FIGURES

To understand the present invention, it will now be described by way of example, with reference to the accompanying Figures in which:

FIG. 1 is a top perspective view of a pallet support board in accord with an embodiment of the present invention.

FIG. 2 is a side plan view of a pallet support board in accord with an embodiment of the present invention.

FIG. 3 is an end plan view of a pallet support board in accord with an embodiment of the present invention.

FIG. 4A is a top perspective view of a pallet support board in accord with an embodiment of the present invention.

FIG. 6 is a side plan view of a top frame in accord with an embodiment of the present invention.

FIG. 7 is an end plan view of a top frame in accord with an embodiment of the present invention.

FIG. 8 is a top plan view of a top frame in accord with an embodiment of the present invention.

DETAILED DESCRIPTION OF THE INVENTION

Figure 4:
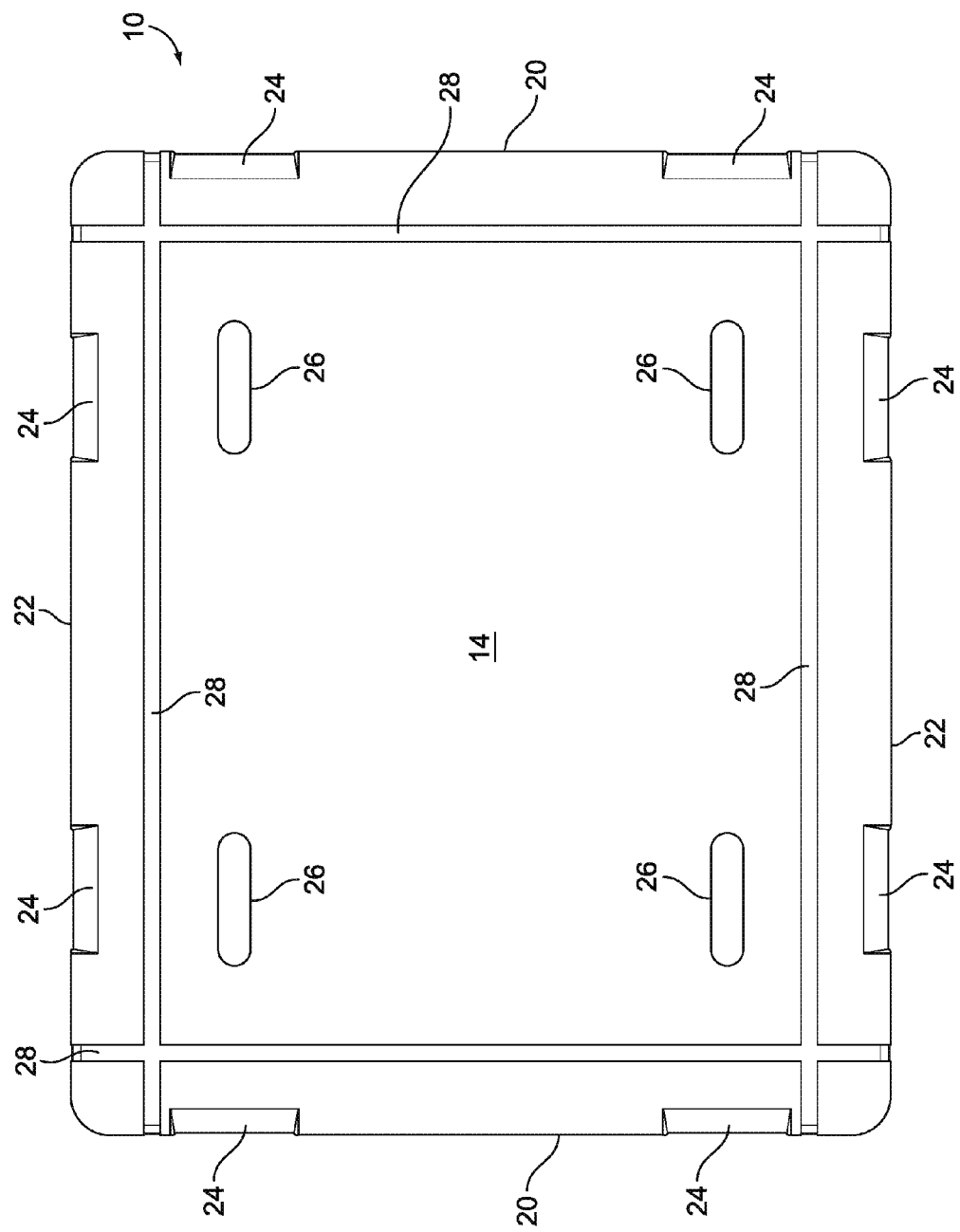
FIG. 4 is a top plan view of a pallet support board in accord with an embodiment of the present invention.
Figure 5:
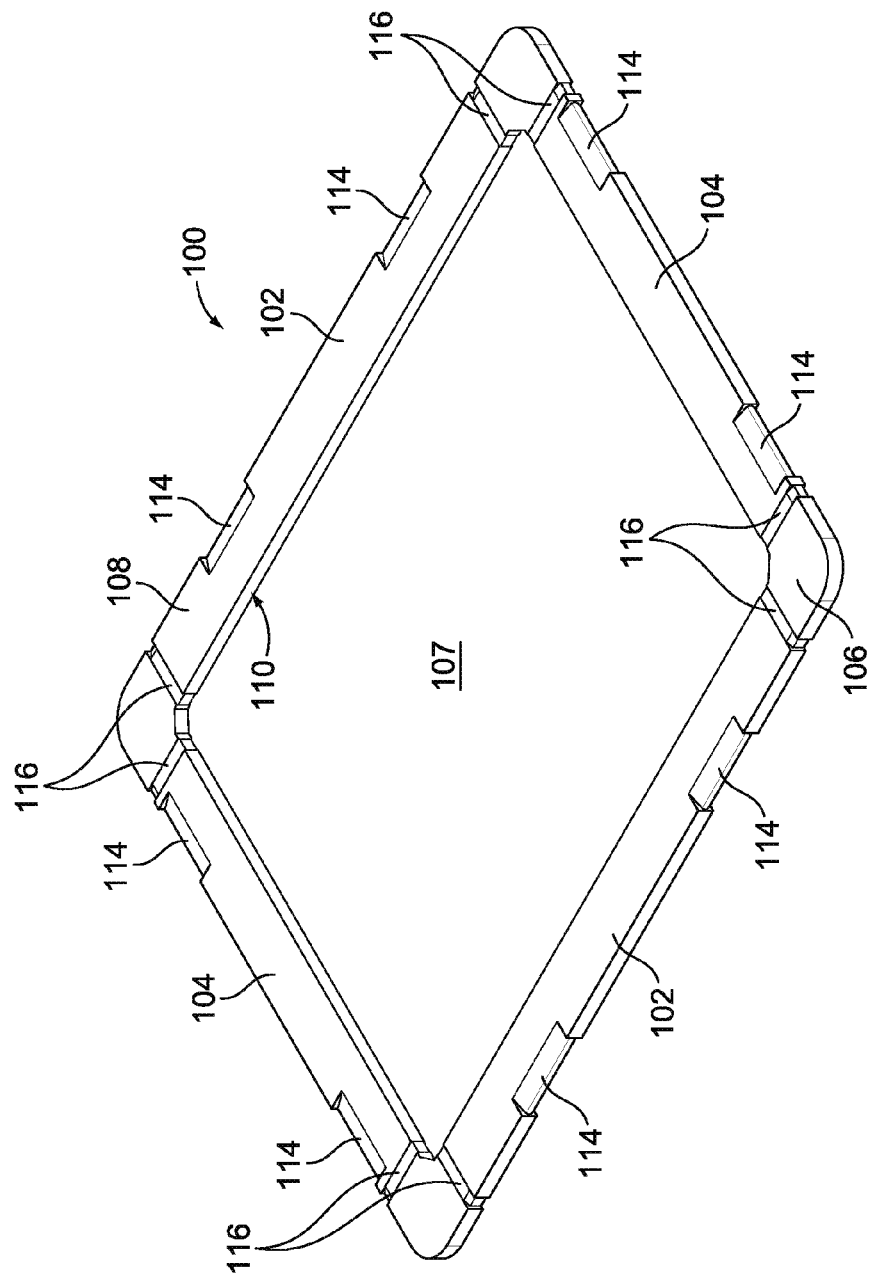
FIG. 5 is a top perspective view of a top frame in accord with an embodiment of the present invention.

While this invention is susceptible of embodiments in many different forms, there is shown in the Figures, and will herein be described in detail, preferred embodiments of the invention with the understanding that the present disclosure is to be considered as an exemplification of the principles of the invention, and is not intended to limit the broad aspect of the invention to the embodiments illustrated.

FIGS. 1 through 4A show a pallet support board 10 made in accord with an embodiment of the present invention. The pallet support board 10 is made from a thermoset foam material. Suitable thermoset foam materials can include polyurethane foam, urethane foam, epoxy foam, phenolic foam, syntactic foam, polyaspartic foam, and hybrids of these foams. In a preferred embodiment, polyurethane foam is used. The pallet support board 10 includes a generally rectangular deck 12 having an inner layer 13 and an outer surface 15. The inner layer 13 and outer surface 15 define a thickness 18. A typical thickness 18 is on the order of ¼ to 1½ inches, however, the deck 12 can be of any suitable thickness for its intended application. The deck 12 also includes a pair of opposing ends 20, and a pair of opposing sides 22. The pallet support board 10 can be made in any size suitable for its application.

In an embodiment, both of the opposing ends 20 and opposing sides 22 include tapered sections 24 along an outer edge 25. It will be understood that the tapered sections 24 need not be on both the opposing ends 20 and opposing sides 22. Furthermore, as shown in FIG. 4A, the tapered sections 24 may extend substantially along the entire length of one or both of the opposing ends 20 and/or opposing sides 22.

In one embodiment, the tapered sections 24 are tapered across the thickness 18 from an upper surface 14 and lower surface 16. The tapered sections 24 are sized and located to accept forklift tines during handling and transport. The deck 12 also includes on at least one of the upper surface 14 or lower surface 16 banding slots 28 to accommodate bands used to secure the pallet support board 10 to an associated loaded pallet or other item placed on the board. In one embodiment, at least portions of the upper surface 14 and/or lower surface 16 of the pallet support board 10 have an exterior skin that is rubberized or texturized to help prevent slippage between the pallet support board 10 and the load with which it is used. The pallet support board 10 may include hand holds 26 which extend through at least part of the thickness 18.

In an embodiment of the pallet support board 10, the foam varies in density along the thickness 18 of the deck 12 such that the density is greater nearest the outer surface 15, including upper and lower surfaces 14 and 16, than in the center of the thickness 18. The density can vary continuously across the thickness 18, or there can be two or more discrete layers of similar density, e.g., an inner density and an outer (i.e., skin) density. The density of the foam material near the outer surface 15 such that the foam creates a hard outer shell. Such material may include a "self-skinning" foam further described below. The higher density foam at the outer surfaces provides impact resistance and deflection strength as well as a hard surface and a stiff structure. In other embodiments, the pallet support board 10 is a generally uniform density throughout the thickness 18.

In a preferred polyurethane foam embodiment, the foam is created from mixing two components: isocyanate and polyol. The formulation of the components is determined by the desired characteristics of the finished foam. In a preferred embodiment, the foam has a density in the range of 6 to 27 pounds per cubic foot, and more preferably in a range between 8 and 18 pounds per cubic foot, with higher densities at the outer surface 15, including upper and lower surfaces 14 and 16.

To make a polyurethane foam pallet support board 10, the isocyanate and polyol are mixed either mechanically or manually. The polyol is available from Burtin Polymer Laboratories of Cartersville, Ga. In an embodiment of the invention, fire retardant materials may be added into the foam mixture to enhance resistance to fire. Coloring agents can also be added to the foam mixture for any desired color. The mixture is injected or poured into a tool cavity, where it will remain until cured. The foam is preferably molded using either reactive injection molding (RIM) or resin transfer molding (RTM) processes, although any suitable molding process may be used, including manually mixing and pouring the mixture into a mold cavity. After the mixture is poured into the mold, it must cure for a specified time depending on the formulation of the components. After curing, the foam pallet support board is ejected from the tool cavity either mechanically or manually.

Figure 15:
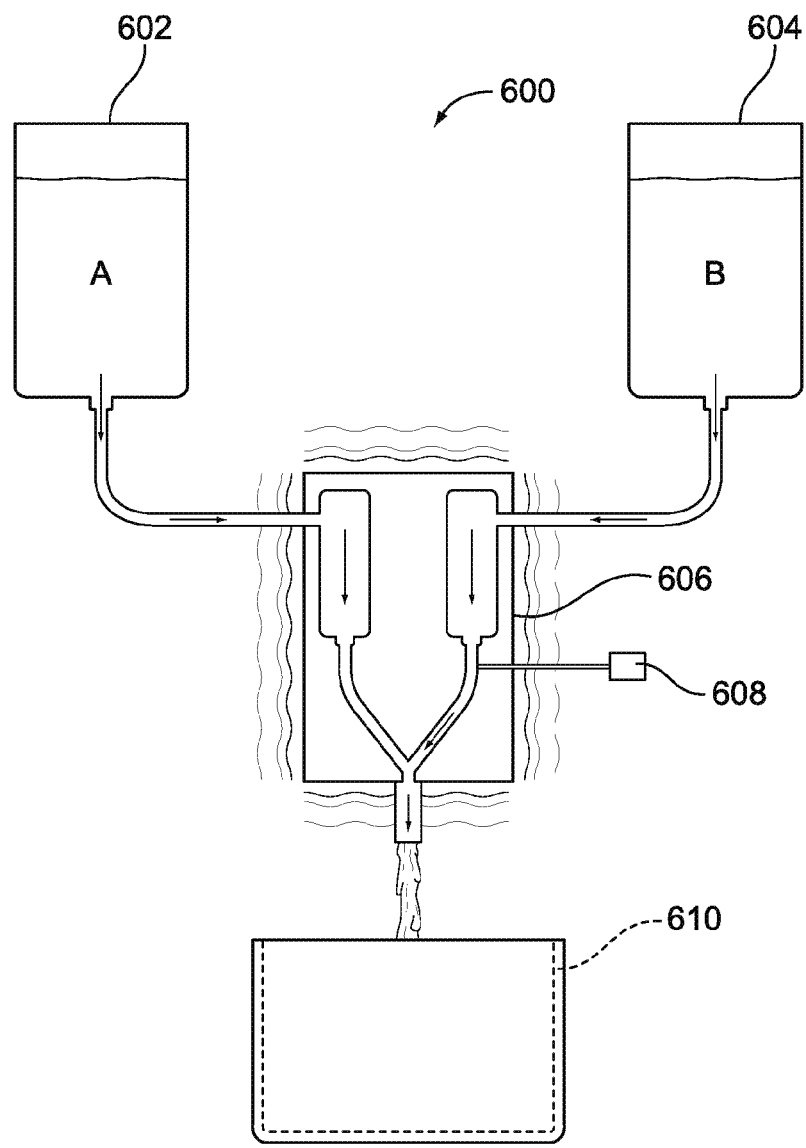
FIG. 15 is a schematic view showing the process for making self-skinning foam in accord with an embodiment of the present invention.

One embodiment of the process 600 by which the self-skinning urethane foam is made is shown in FIG. 15. The process 600 includes a first tank 602 containing isocyanate. A second tank 604 contains polyol. The materials from tanks 602 and 604 are directed to a meter 606. The meter 606 measures the desired amounts of isocyanate and polyol and their flow rates. The polyol is preferably heated at the meter 606 by a heater 608 to a temperature of approximately 125 degrees Fahrenheit. Thermally activated foam is preferable to chemically activated foam. After metering, the polyol and isocyanate are combined and inserted into an aluminum mold 610.

It has been found that a range of between 6 and 10 pound per cubic foot density foam, constrained by the mold 610 creates the desired density and strength of material and the self-skinning feature of the foam. This desired density of the molded foam is between ten and nineteen pounds per cubic feet. Other ranges can be used depending on the application. Additionally, it has been found that maintaining the temperature of the mold 610 to between 80 and 100 degrees Fahrenheit results in the skin forming with the desired results. The closer to 80 degrees, the thicker the outer skin. It is believed that these temperatures result in the urethane in the foam solidifying where the foam meets the mold 610. It has also been found that keeping the temperature of the materials warmer than the mold 610 before the material is inserted into the mold 610 could be important to proper skin formation. The self-skinning can also be accomplished using a foam formulation that would provide such skinning.

The mold 610 interior surfaces may be textured using known means such as sandblasting or acid etching. This creates a corresponding texture 612 (see FIG. 14) in the exterior surface of the outer skin of a product formed in the mold.

In addition, the mixture of polyol and isocyanate can have one or more fillers added to reduce the cost of manufacture. Suitable fillers include ceramic microballoons, recycled glass, calcium carbonate and wollastonite. Ceramic microballoons provide an additional advantage in that they are 20% lighter than the foam, and add strength to the foam. Additionally, differing formulations for the polyol and isocyanate formulations can provide differing outer skin thickness.

In operation, the process includes the steps of providing a desired formulation of iscoyanate and polyol. At least one of the isocyanate and polyol are heated to a temperature of between 80 and 125 degrees Fahrenheit. The iscoyanate and polyol are combined to form a foam solution. The foam solution is injected into the mold 610. Alternatively, the isocyanate and polyol are injected separately and mixed within the mold 610. The mold 610 is heated to a temperature of between eighty and one hundred degrees Fahrenheit, preferably nearer eighty degrees. After injection, the foam mixture expands to fill the mold 610. The mixture is left to cure within the mold 610. The mold 610 constricts the expansion of the foam mixture to increase its density to the desired density. After curing, the finished product is removed from the mold.

In another embodiment, the finished foam pallet support board 10 may be coated with a polyurea material coating. The polyurea coating will increase the deflection strength of the pallet support board 10, as well as increase its impact resistance, surface toughness, and wear resistance. In addition, the polyurea coating can have a textured surface to meet any desired friction characteristics. In an embodiment of the invention, a substrate such as a low, medium, or high density fiber board, or plywood can be coated with polyurea foam. A contemplated polyurea coating that may be used is Line-X or Bullet-Liner, available from Burtin Polymer Laboratories of Cartersville, Ga.

FIGS. 5 through 8A and 14 show a top frame 100 formed from a structural thermoset foam material in accord with an embodiment of the present invention. The top frame 100 has a pair of substantially parallel sides or legs 102 and a pair of substantially parallel ends or legs 104. The sides 102 and ends 104 are connected to form a generally rectangular unitary frame structure 106 having a central opening 107. The frame structure 106 can be sized in accord with its intended use. The frame structure 106 has an inner layer 105 and outer surface 109, including upper surface 108 and a lower surface 110. The upper surface 108 and lower surface 110 are separated by foam having a thickness 112. The thickness 112 typically is on the order of ¼ to 1½ inches, but may be any thickness suitable for its intended application. In an embodiment, the top frame 100 includes one or more bracing members extending between the sides 102 and/or ends 104 and/or corners.

Figure 8A:
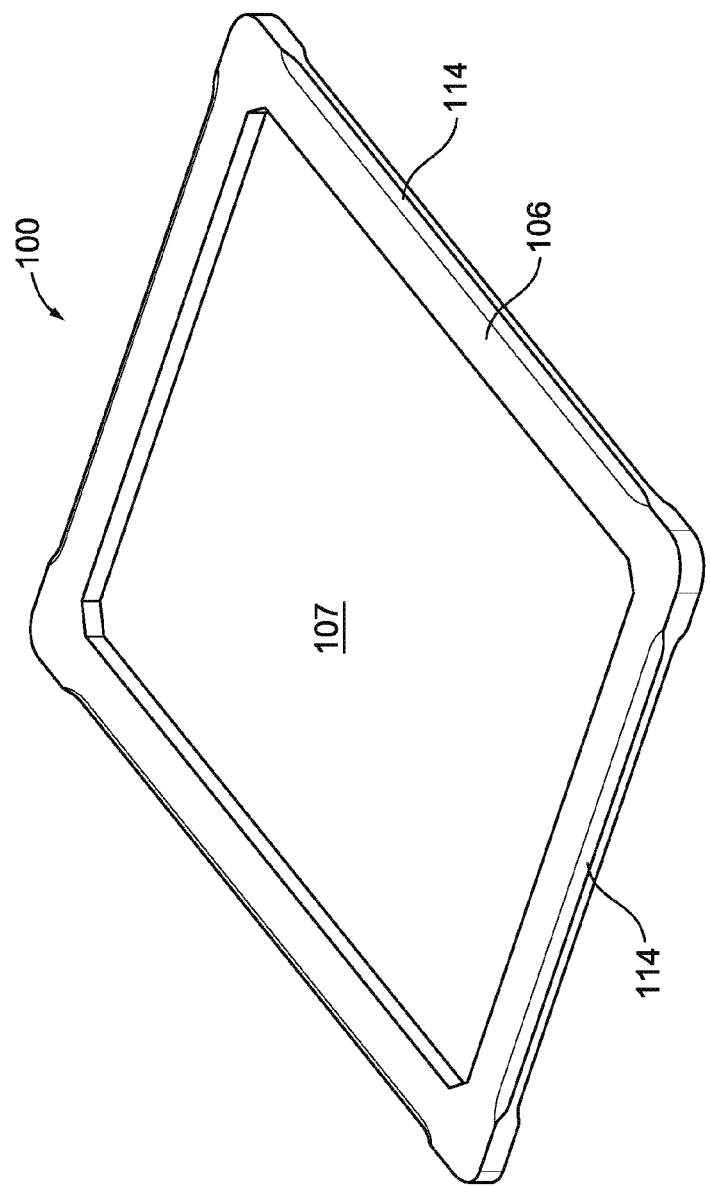
FIG. 8A is a top perspective view of a top frame in accord with an embodiment of the present invention.

At least one of the sides 102 or ends 104 includes a tapered section 114 along an outer edge. It will be understood that the tapered sections 114 need not be on both the sides 102 and ends 104. Furthermore, as shown in FIG. 8A, the tapered sections 114 may extend substantially along the entire length of the ends 104 and/or sides 102. In one embodiment, the tapered sections 114 are tapered from both the upper surface 108 and lower surface 110. The tapered sections 114 are sized and located to accept forklift tines during handling and transport. The frame structure 106 also includes banding slots 116 on at least one of its upper surface 108 or lower surface 110 to accommodate bands used to secure the top frame 100 to an associated pallet.

Suitable thermoset foam materials can include polyurethane foam, urethane foam, epoxy foam, phenolic foam, syntactic foam, polyaspartic foam, and hybrids of these foams. In a preferred embodiment, polyurethane foam is used. The polyurethane foam material is made in the same general process and with the same general characteristics as described above with respect to the pallet support board 10.

In an embodiment, the frame 100 is formed such that the foam varies in density along the thickness 112 of the frame structure 106 to have a density greater nearest the outer surface 109, including upper and lower surfaces 108 and 110, than in the center of the thickness 112. The density can vary continuously across the thickness 112, or there can be two or more discrete layers of similar density, e.g., an inner density and an outer (i.e., skin) density. In other embodiments, the top frame 100 is a generally uniform density throughout the thickness 112. The density of the foam material near the outer surface 109, and upper and lower surfaces 108 and 110 are such that the foam creates a hard outer shell. Such material may include a "self-skinning" foam as described above. A frame 100 made by this method weighs approximately seven to eight pounds. In one embodiment, at least portions of the upper surface 108 and/or lower surface 110 of the top frame 100 have an exterior skin which is rubberized or texturized to help prevent slippage between the top frame 100 and the load with which it is used.

In another embodiment, the finished foam top frame 100 may be coated with a polyurea material coating. The polyurea coating will increase the deflection strength of the top frame 100, as well as increase its impact resistance, surface toughness, and wear resistance. In addition, the polyurea coating can have a textured surface to meet any desired friction characteristics. In an embodiment of the invention, a substrate such as a low, medium, or high density fiber board, or plywood can be coated with polyurea foam. A contemplated polyurea coating that may be used is Line-X or Bullet-Liner, available from Burtin Polymer Laboratories of Cartersville, Ga.

In an embodiment, the top frame 100 is molded using the same process as described above with respect to the pallet support board 10. Similarly, the top frame 100 can be made from a foam or other substrate, and coated with polyurea material as disclosed above with respect to the pallet support board 10. The polyurea material may be textured to include any desirable friction characteristics.

Figure 14:
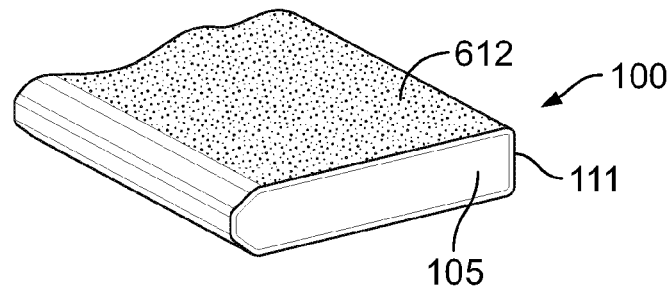
FIG. 14 is a perspective cross-sectional view of a top frame in accord with an embodiment of the present invention.

FIG. 14 is a perspective cross-sectional view of a top frame 100 made in accord with an embodiment of the present invention in which a self-skinning foam is used. The top frame 100 includes an outer layer or skin 111 formed by the process 600 of the present invention. The top frame 100 also includes an inner layer 105. The inner layer 105 is essentially uniform in density, while the outer skin 111 is more dense than the inner layer 105. The outer skin 111 is durable and hard to withstand and resist cuts, abrasions and wear. The pallet board 10, pallet 200, insulated tote 400, and dolly 500 made with the self-skinning foam of this method will have a similar structure.

Figure 9:
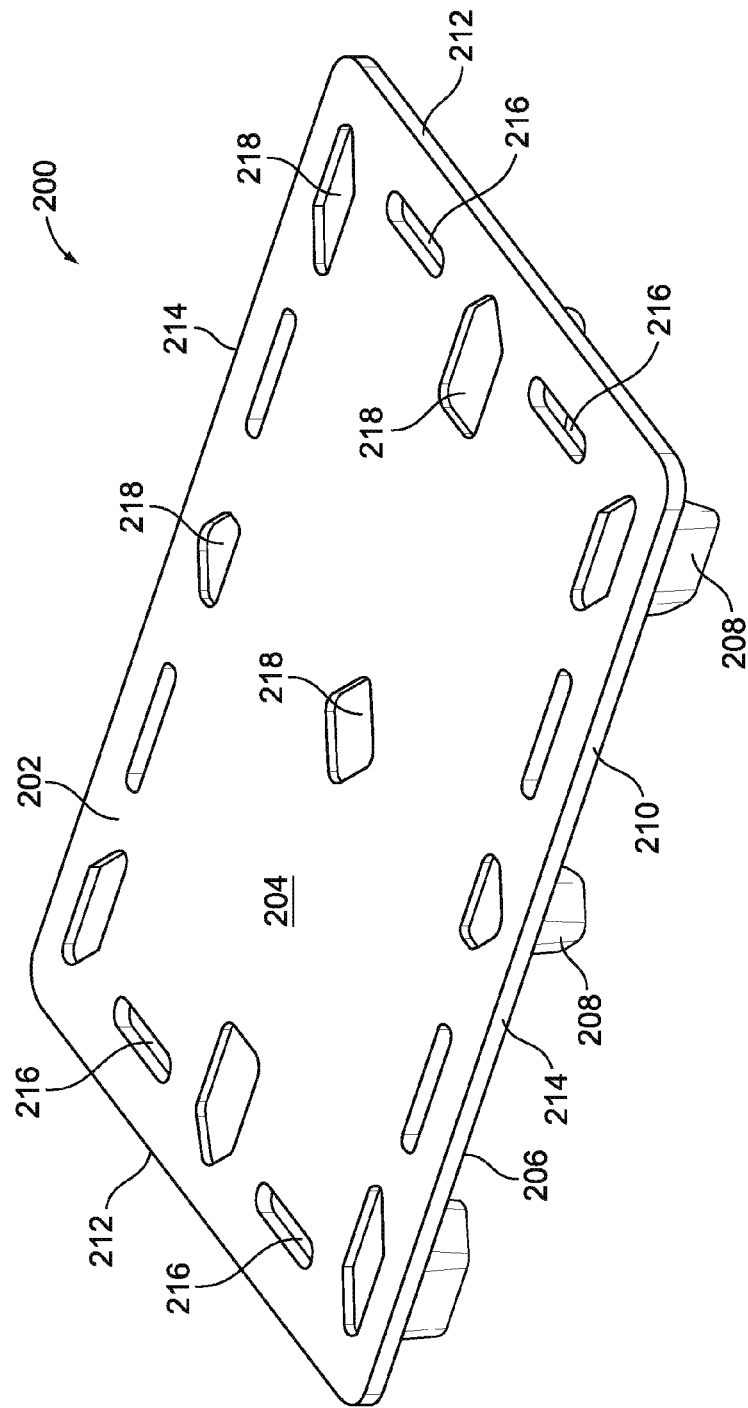
FIG. 9 is a top perspective view of a pallet in accord with an embodiment of the present invention.

FIG. 9 shows a pallet 200 in accord with an embodiment of the present invention. The pallet 200 has a deck 202 with an inner layer 203 and outer surface 205 having an upper surface 204 and a lower surface 206. Extending from the lower surface 206 are a plurality of legs 208. The legs 208 support a load placed on the upper surface 204. A thickness 210 extends between the upper surface 204 and lower surface 206. A typical thickness 210 is on the order of ¼ to 1½ inches, but the deck 202 can be of any suitable thickness for its intended application. The deck 202 also includes a pair of opposing ends 212, and a pair of opposing sides 214. The pallet 200 can be made in any size suitable for its application.

In one embodiment, at least portions of the upper surface 204 and/or lower surface 206 of the pallet 200 have an exterior skin that is rubberized or texturized to help prevent slippage between the pallet 200 and the load with which it is used. In another embodiment, the upper surface 204 includes indented portions 218 corresponding to the legs 208 of a second pallet 200 for stacking one pallet 200 on top of another.

The pallet 200 is also made of a thermoset foam material. Suitable thermoset foam materials can include polyurethane foam, urethane foam, epoxy foam, phenolic foam, syntactic foam, polyaspartic foam, and hybrids of these foams. In a preferred embodiment, polyurethane foam is used. The polyurethane foam material is made in the same general process and with the same general characteristics as described above with respect to the pallet support board 10.

In an embodiment, the foam varies in density along the thickness 210 of the deck 202 such that the density is greater nearest the outer surface 205, including surfaces 204 and 206, than in center of the thickness 210. The density can vary continuously across the thickness 210, or there can be two or more discrete layers of similar density, e.g., an inner density and an outer (i.e., skin) density. In other embodiments, the pallet 200 is a single density throughout the thickness 210. The density of the foam material near the outer surface 205, including surfaces 204 and 206 are such that the foam creates a hard outer shell. Such material may include a "self-skinning" foam as described above.

In another embodiment, the finished foam pallet 200 may be coated with a polyurea material coating. The polyurea coating will increase the deflection strength of the pallet 200, as well as increase its impact resistance, surface toughness, and wear resistance. In addition, the polyurea coating can have a textured surface to meet any desired friction characteristics. In an embodiment of the invention, a substrate such as a low, medium, or high density fiber board, or plywood can be coated with polyurea foam. A contemplated polyurea coating that may be used is Line-X or Bullet-Liner, available from Burtin Polymer Laboratories of Cartersville, Ga.

Figure 22:
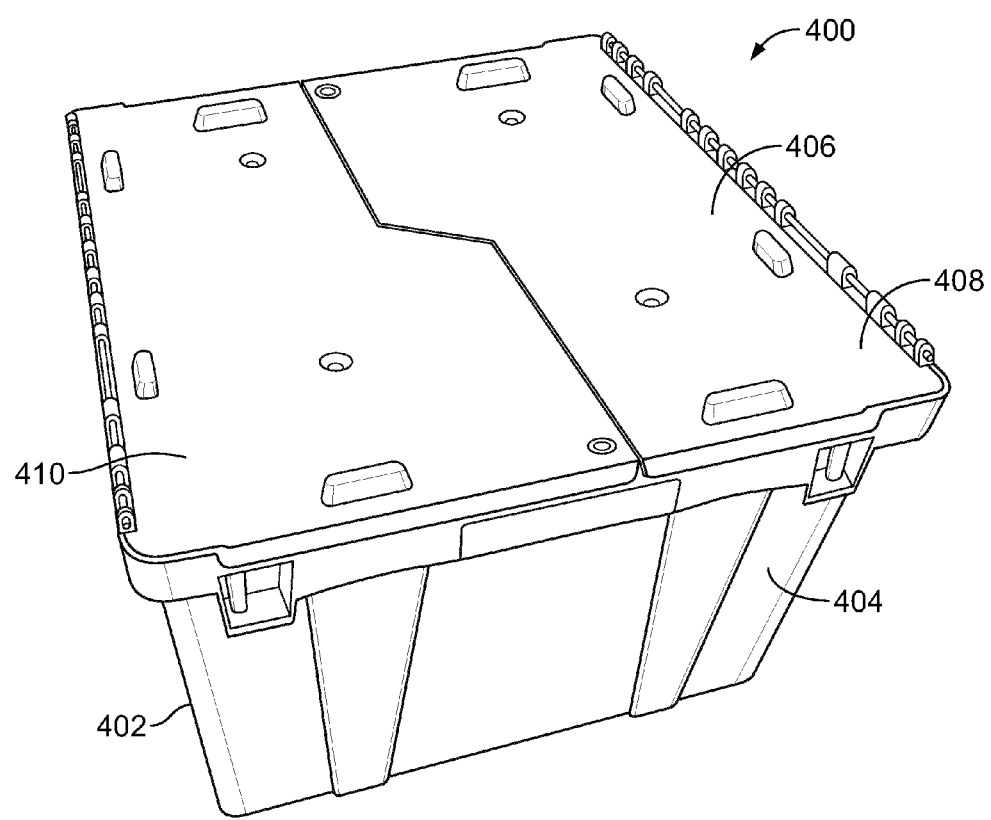
FIG. 22 is a perspective view of an insulated tote in accord with an embodiment of the present invention.
Figure 23:
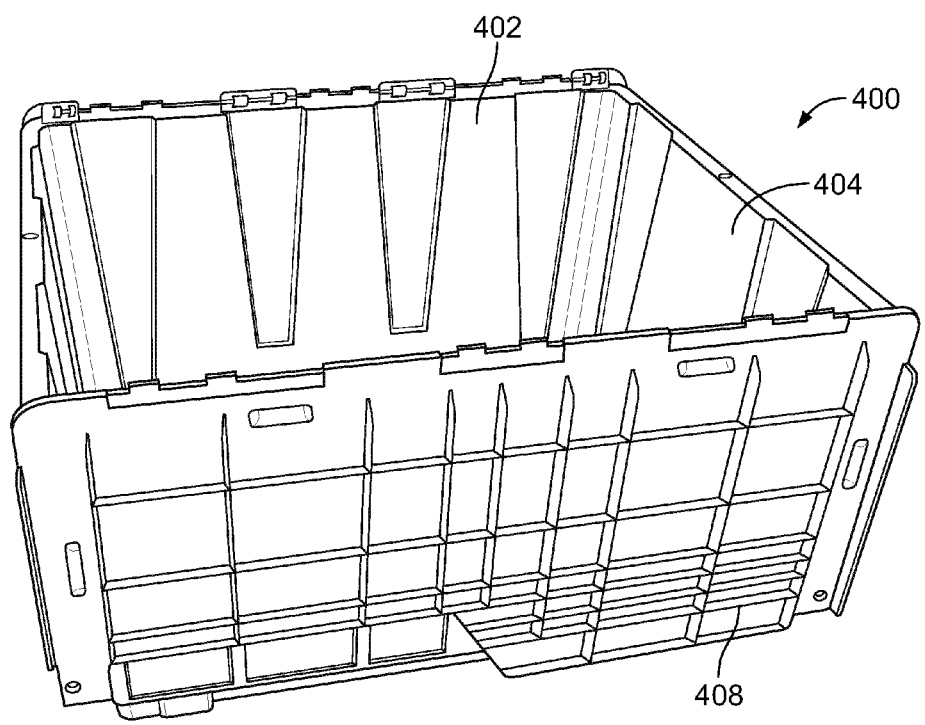
FIG. 23 is a perspective view of an insulated tote in accord with an embodiment of the present invention.
Figure 34:
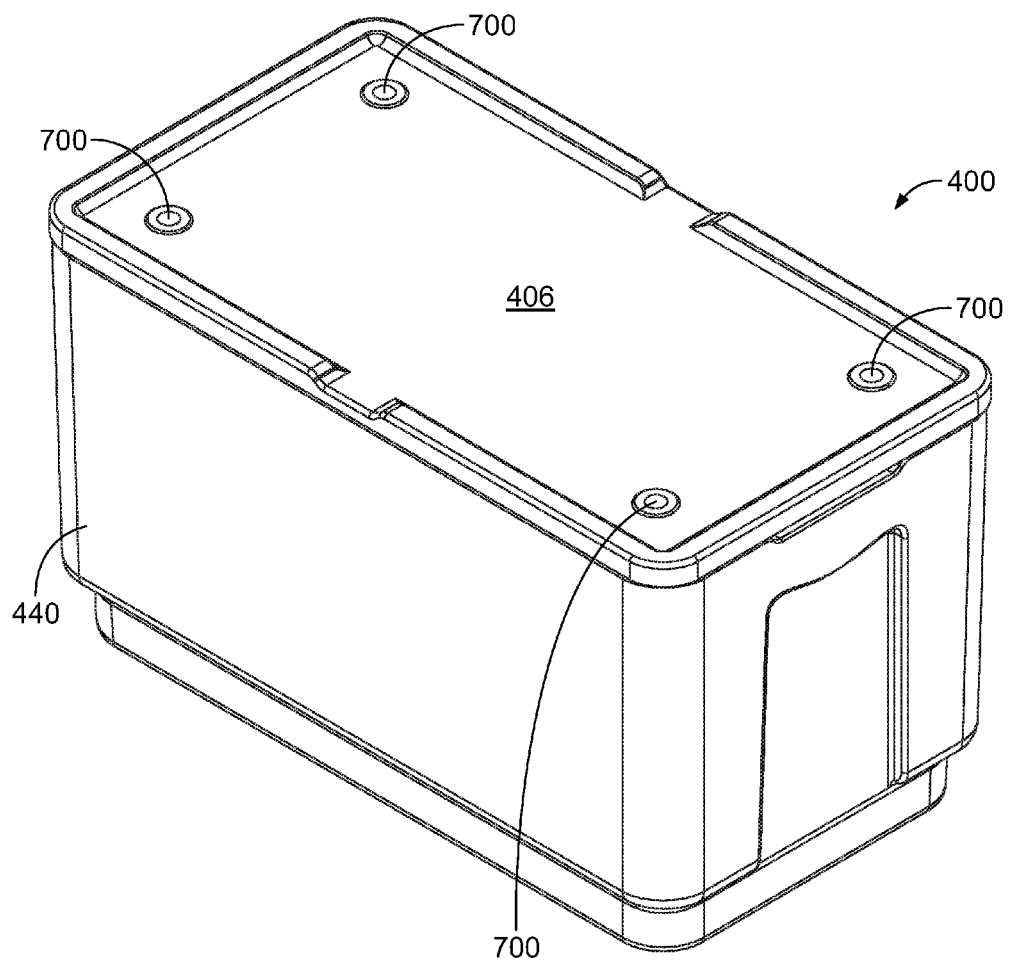
FIG. 34 is a perspective view of a tote in accord with an embodiment of the present invention.
Figure 35:
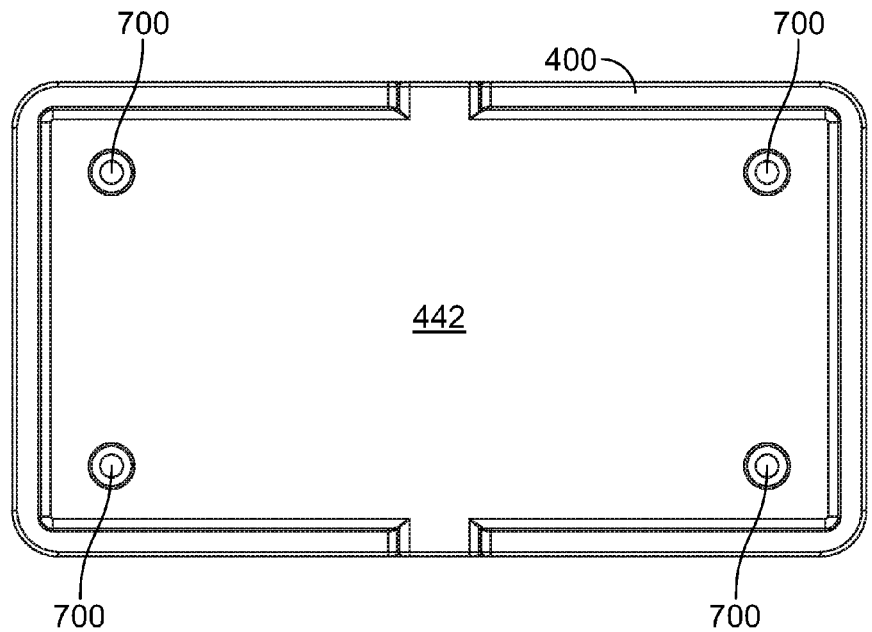
FIG. 35 is a top view of a tote in accord with an embodiment of the present invention.
Figure 36:
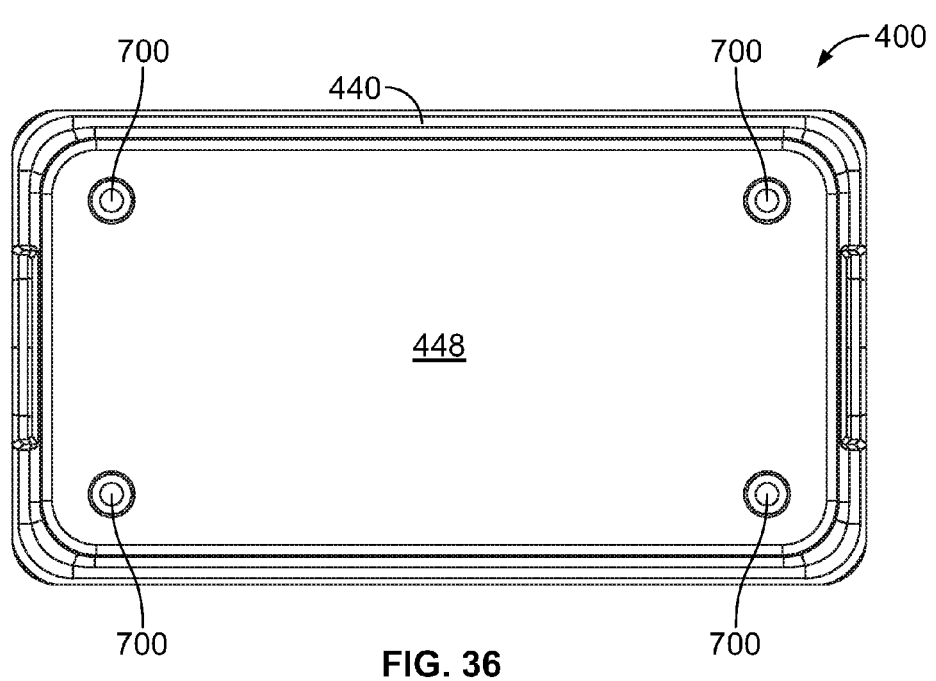
FIG. 36 is a bottom view of a tote in accord with an embodiment of the present invention.
Figure 37:
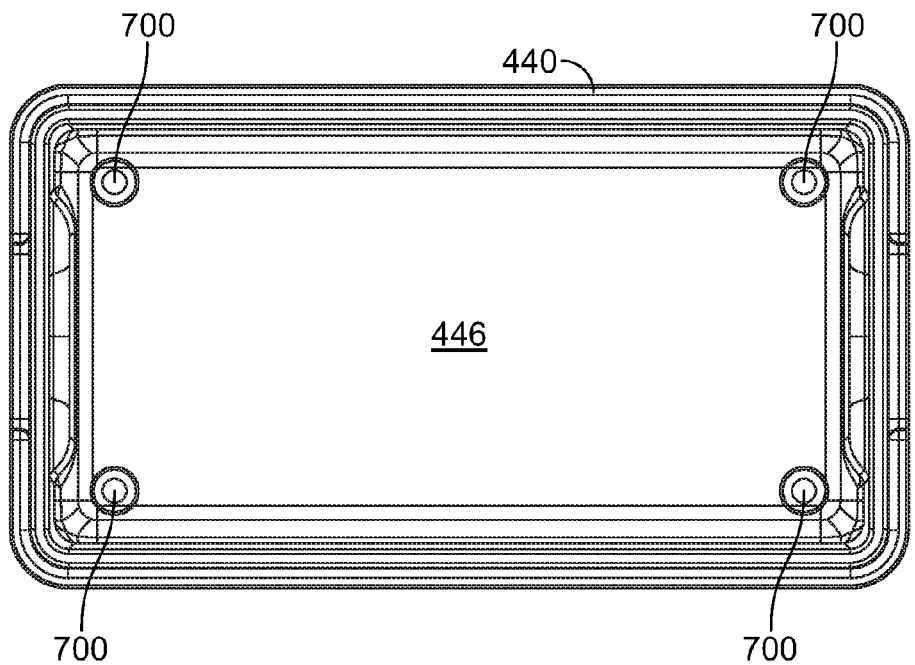
FIG. 37 is a top view of a tote without the lid in accord with an embodiment of the present invention.
Figure 38:
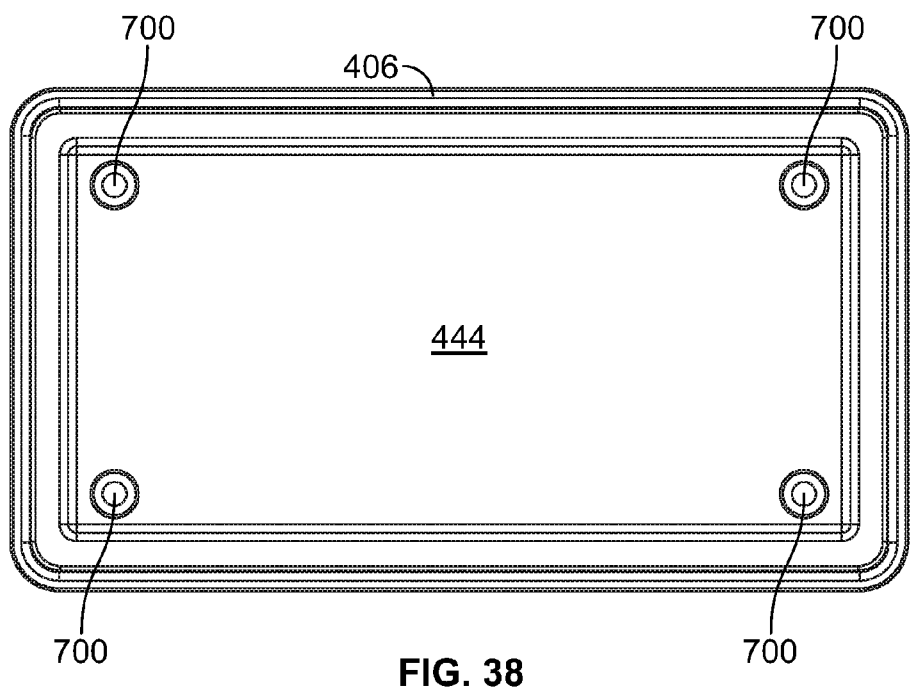
FIG. 38 is a bottom view of a tote lid in accord with an embodiment of the present invention.

FIGS. 18 through 20 and 22 through 23 show an insulated tote 400 of embodiments of the present invention. The tote 400 includes a pair of opposing side walls 402 and a pair of opposing end walls 404 and lid 406. As shown in FIGS. 22 and 34, it also can include a lid 406 having a first side 408 and a second side 410.

In one embodiment, the tote 400 includes a liner 412 made of a self-skinning rigid urethane foam as described above to form an inner layer 413 and outer surface 415. It has been found that the self-skinning rigid urethane foam insulates better than current polystyrene liners, or other insulating materials. Moreover, the self-skinning foam is much more durable. Its hard outer skin is resistant to abrasions, cuts and wear. The liner 412 is sized and shaped to be inserted into the tote 400. The tote 400 also includes a self-skinning urethane foam cover 414 to be placed on top of the liner 412, and still allow the lid 406 to completely close.

In another embodiment, the tote 400 is completely made of self-skinning rigid urethane foam, including the side walls 402, end walls 404, and lid 406. In a third embodiment, all but the lid 406 is made of self-skinning rigid urethane foam. The tote 400 in these two embodiments does not require a liner 412, but one may be provided for additional insulation.

Figure 16:
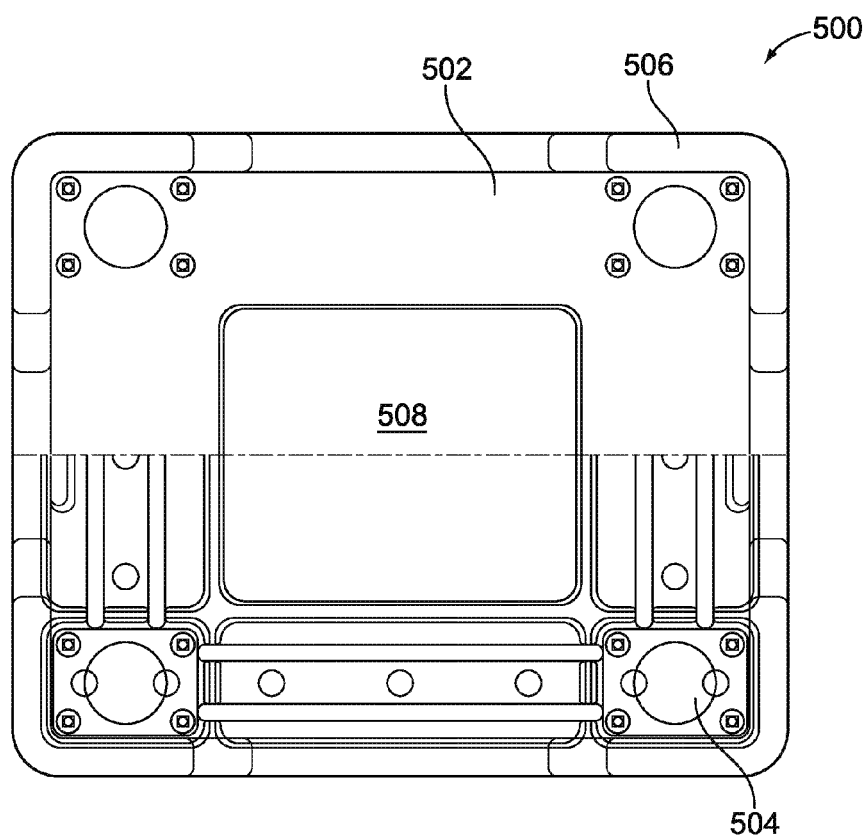
FIG. 16 is a plan view of a dolly in accord with an embodiment of the present invention.
Figure 17:
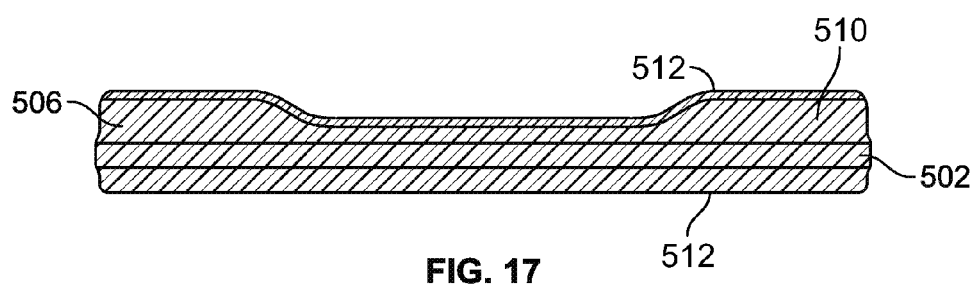
FIG. 17 is a side view of a dolly in accord with an embodiment of the present invention.
Figure 18:
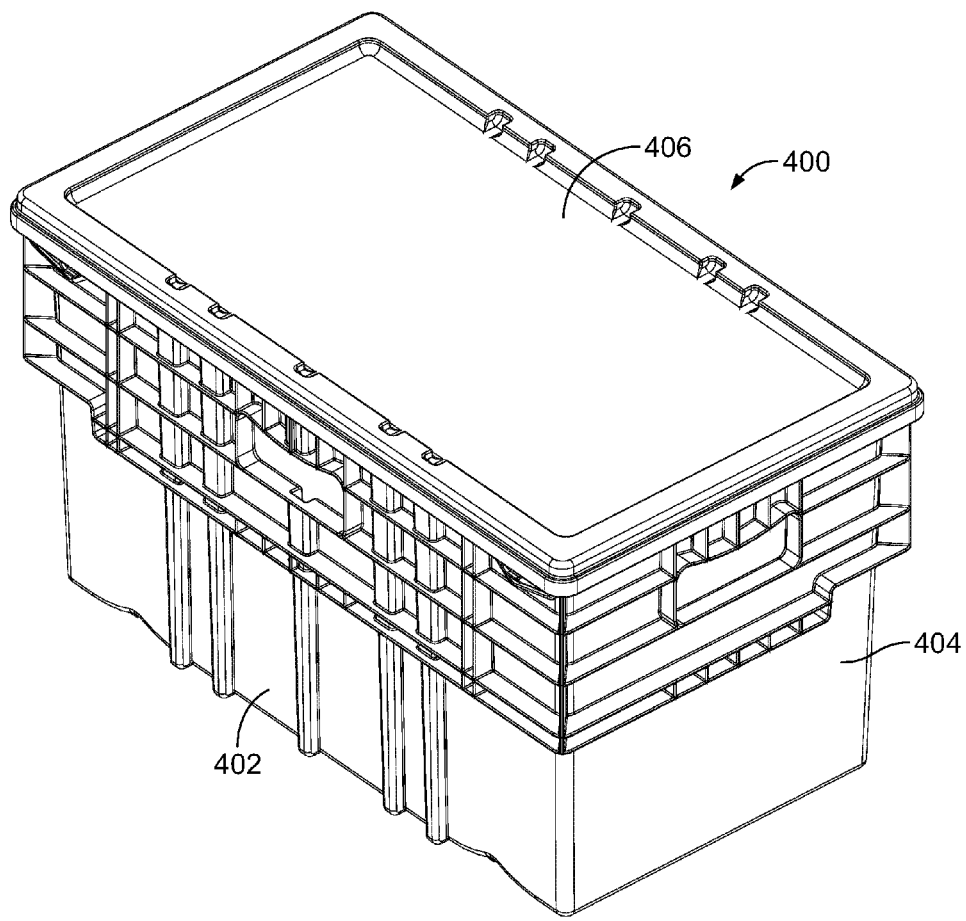
FIG. 18 is a perspective view of an insulated tote in accord with an embodiment of the present invention.
Figure 19:
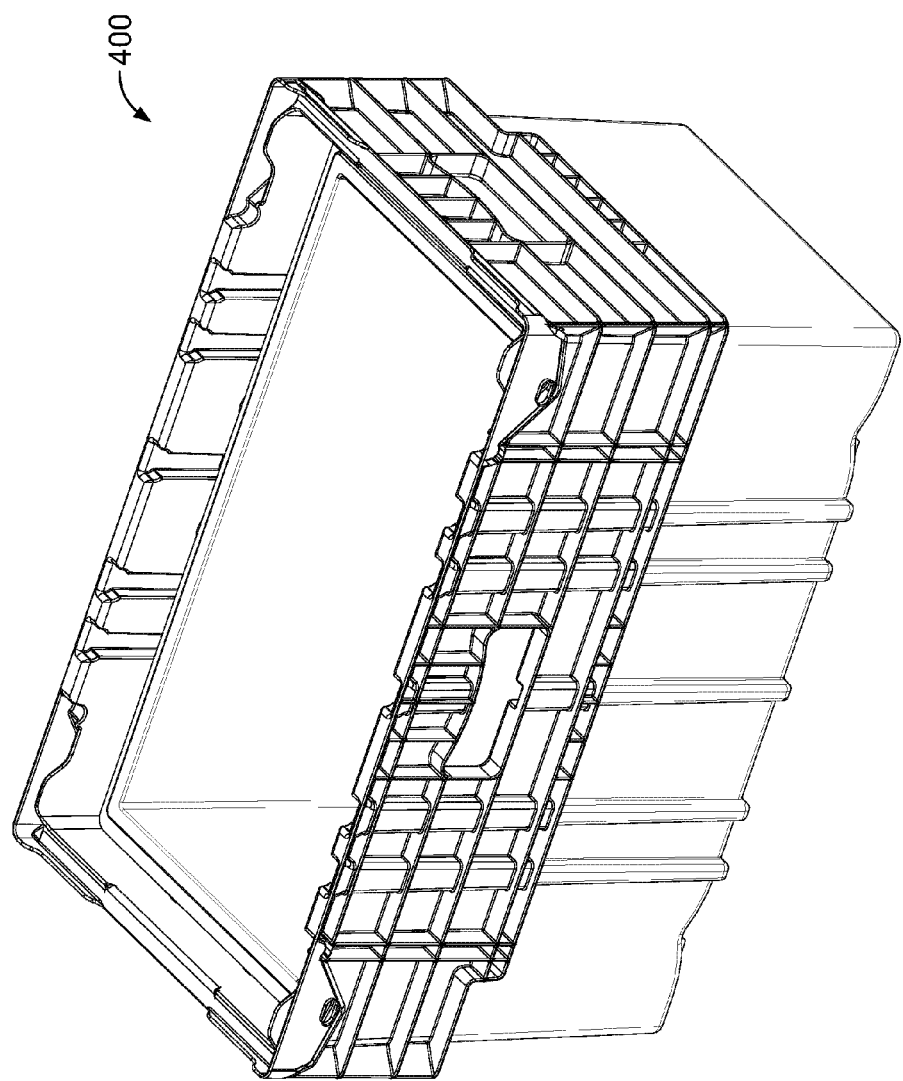
FIG. 19 is a perspective view of an insulated tote in accord with an embodiment of the present invention.
Figure 20:
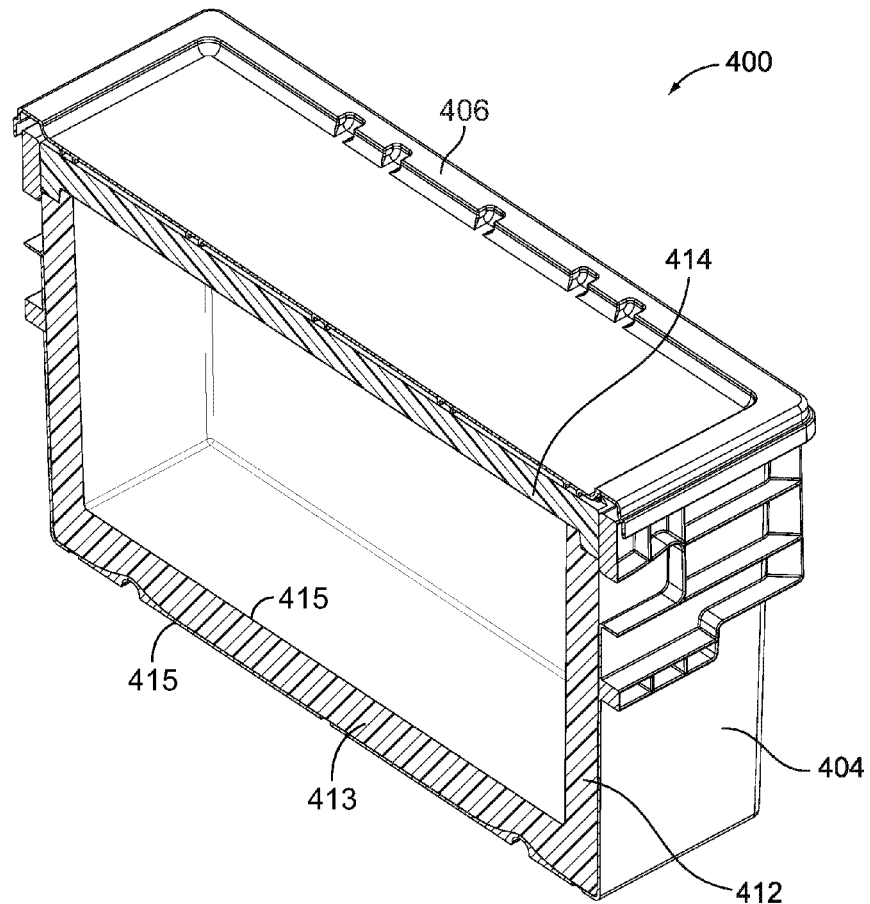
FIG. 20 is a cross-sectional perspective view of an insulated tote in accord with an embodiment of the present invention.
Figure 21:
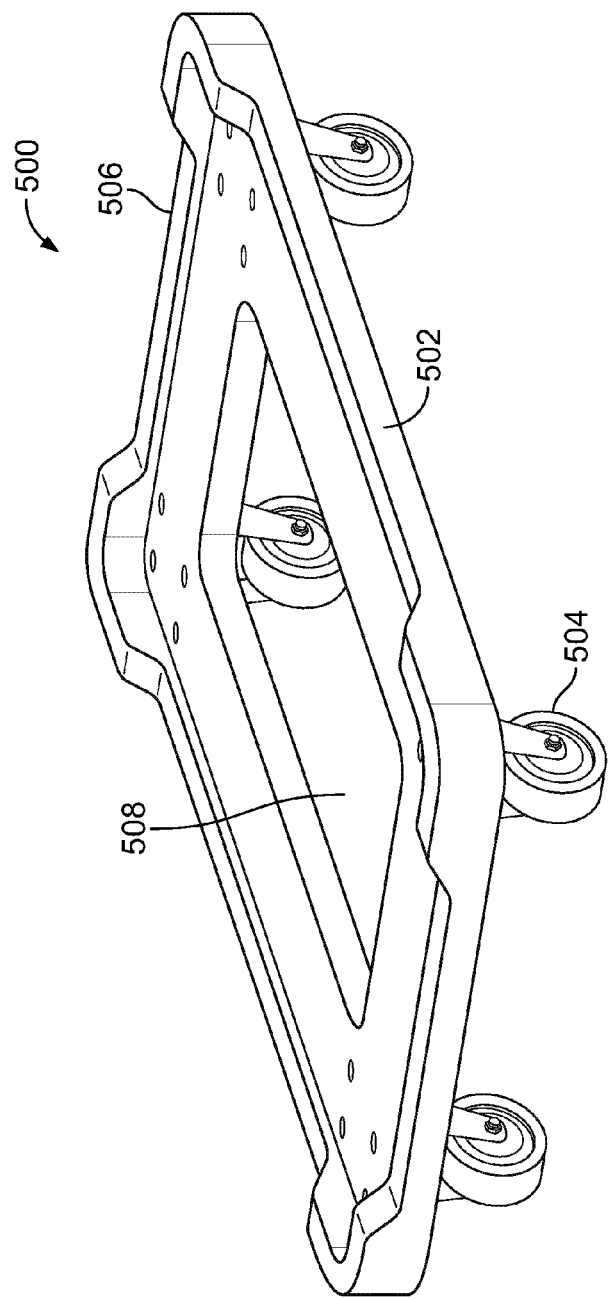
FIG. 21 is a perspective view of a dolly in accord with an embodiment of the present invention.

In a further embodiment a dolly 500 is provided in FIGS. 16, 17 and 21. The dolly 500 has includes a body 502. The body 502 includes a caster 504 at each corner. The body 502 includes an elevated edge 506 and an opening 508 in its center. The body has an inner layer 510 and outer surface 512. Current dollies are made using a rotomold or injection molding process known in the art. Current dollies are hollow and made of a thermoplastic. Dollies are subject to rough treatment. The dolly 500 of an embodiment of the present invention is made of the self-skinning urethane foam as described above to create the inner layer 510 and outer surface 512. This provides a more durable dolly. The outer skin is hard and resists abrasions, cuts and wear better than thermoplastic dollies.

In one embodiment of the invention, the decks 12, frame structure 106 and deck 202 of the pallet support board 10, top frame 100, and pallet 200 can include a reinforcing material disposed within their respective thicknesses 18, 112, and 210. The reinforcing material can be any one or more of woven or continuous strand glass matting, glass fiber, chopped fiberglass, metal tubing, plastic tubing, pultruded glass rod, graphite fibers, Honeywell's Spectra® brand polyethylene fibers, microballoons, nanomaterials, wood or balsa fragments or dust, polyester fibers or components, and shaped metal plates. Other suitable reinforcing materials can also be used. In a preferred embodiment, the reinforcing material is a fiberglass or polyester continuous strand mat or Hi-Lo fiberglass mesh. These reinforcing materials can be provided by Superior Fibers, LLC, of Bremen, Ohio or Fiberboard Industries of Amsterdam, N.Y. The material is placed in the mold before either injection or pouring.

Figure 10:
FIG. 10 is a cross-sectional view of a reinforcement in accord with an embodiment of the present invention.

FIGS. 10 through 13 show several examples of reinforcing materials that may be used with either of the pallet support board 10, top frame 100, or pallet 200. FIG. 10 shows in cross-section of thickness 18 of a deck 12 with a fiberglass matting or other fiber reinforcing material 300 disposed within. The matting or fiber 300 can be oriented to extend along one or more directions of the deck, or in a cross-hatch pattern. The matting 300 may or may not extend the entire length of the deck.

Figure 11:
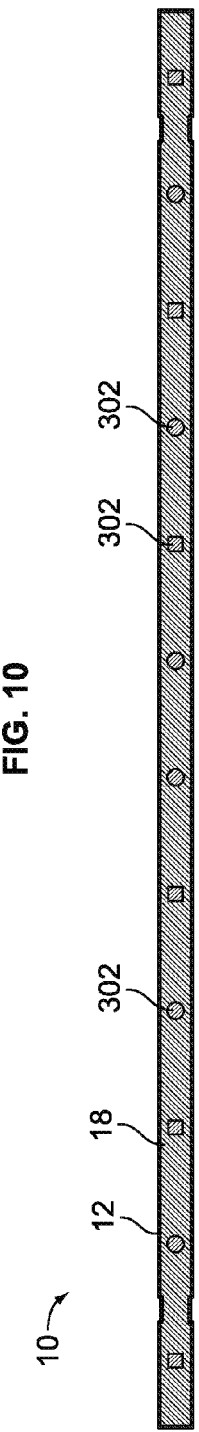
FIG. 11 is a cross-sectional view of a reinforcement in accord with an embodiment of the present invention

FIG. 11 shows in cross-section of thickness 18 of a deck 12 with a plurality of tubes 302 for reinforcing the deck 12. The tubes 302 extend along preferably either the length or width of the deck 12, but may be arranged in both directions. The tubes 302 may or may not extend the entire length of the deck. In embodiments of the invention, the tubes 302 can be made of plastic or metal, preferably steel, and can be in a variety of shapes. These shapes can include round, square, T-shapes, L-shapes, I-shaped, or any other suitable shape.

Figure 12:
FIG. 12 is a cross-sectional view of a reinforcement in accord with an embodiment of the present invention.

FIG. 12 shows in cross-section of thickness 18 of a deck 12 with a plurality of pultruded glass rods 304 for reinforcing the deck 12. The rods 304 extend along preferably either the length or width of the deck 12, but may be arranged in both directions. The rods 304 can be in a variety of shapes. These shapes can include round, square, T-shapes, L-shapes, I-shaped, or any other suitable shape.

Figure 13:
FIG. 13 is a cross-sectional view of a reinforcement in accord with an embodiment of the present invention.

FIG. 13 shows in cross-section of thickness 18 of a deck 12 with a plurality of plates 306 for reinforcing the deck 12. The plates 306 extend along preferably either the length or width of the deck 12, but may be arranged in both directions. The plates 306 may or may not extend the entire length of the deck. In embodiments of the invention, the plates 306 can be made of plastic or metal, preferably steel, and can be in a variety of shapes. These shapes can include M-shaped as shown, V-shaped, X-shaped, or any other suitable shape.

It will be understood that although FIGS. 10 through 13 were discussed with respect to a deck 12 of a pallet support board 10, the principles will apply equally to frame structure 106 and deck 202 of the top frame 100, pallet 200, insulated tote 400, and dolly 500 embodiments. In an embodiment of the invention, the reinforcing materials are placed by hand in the tool cavity before the foam mixture is poured or injected into the tool cavity. Hand placement would be appropriate for larger reinforcing materials such as steel rods and glass matting. Alternatively, where the reinforcing material would permit, the reinforcing material can be mixed with foam mixture either prior to or during the injection molding process.

FIGS. 24-39 show examples of various transport items, including a top frame 100, tote 400, and pallet support board 10 that include a plurality of insertable components. In these examples, the components are shown as grommets 700. Other insertable components such as casters, hinges, reinforcements, latches, gaskets, or similar items can also be used as desired based on the type of application. These insertable components can also be used with other thermoset foam transport items such dollies 500 or pallets 200. The principles described below apply when the insertable components or grommets 700 are used with the other thermoset foam transport items.

Figure 24:
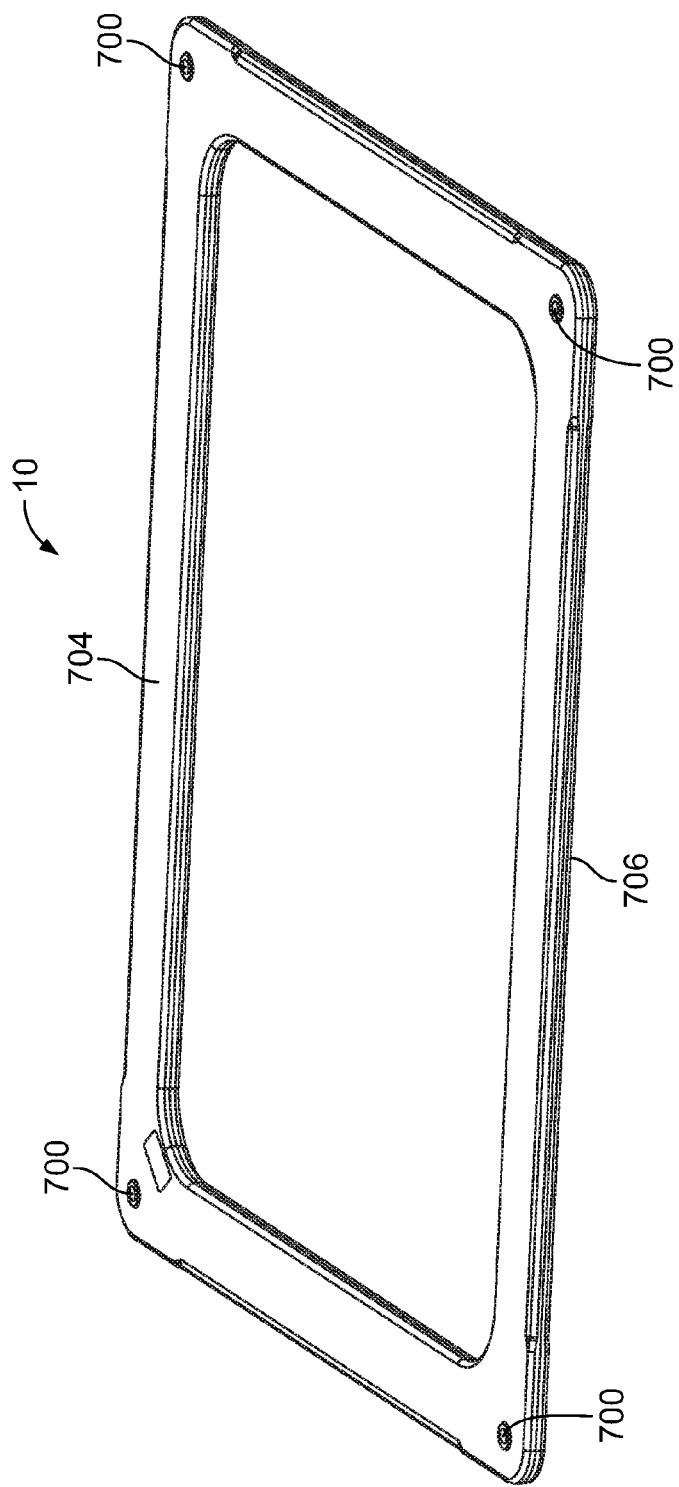
FIG. 24 is a perspective view of a top frame in accord with an embodiment of the present invention.
Figure 25:
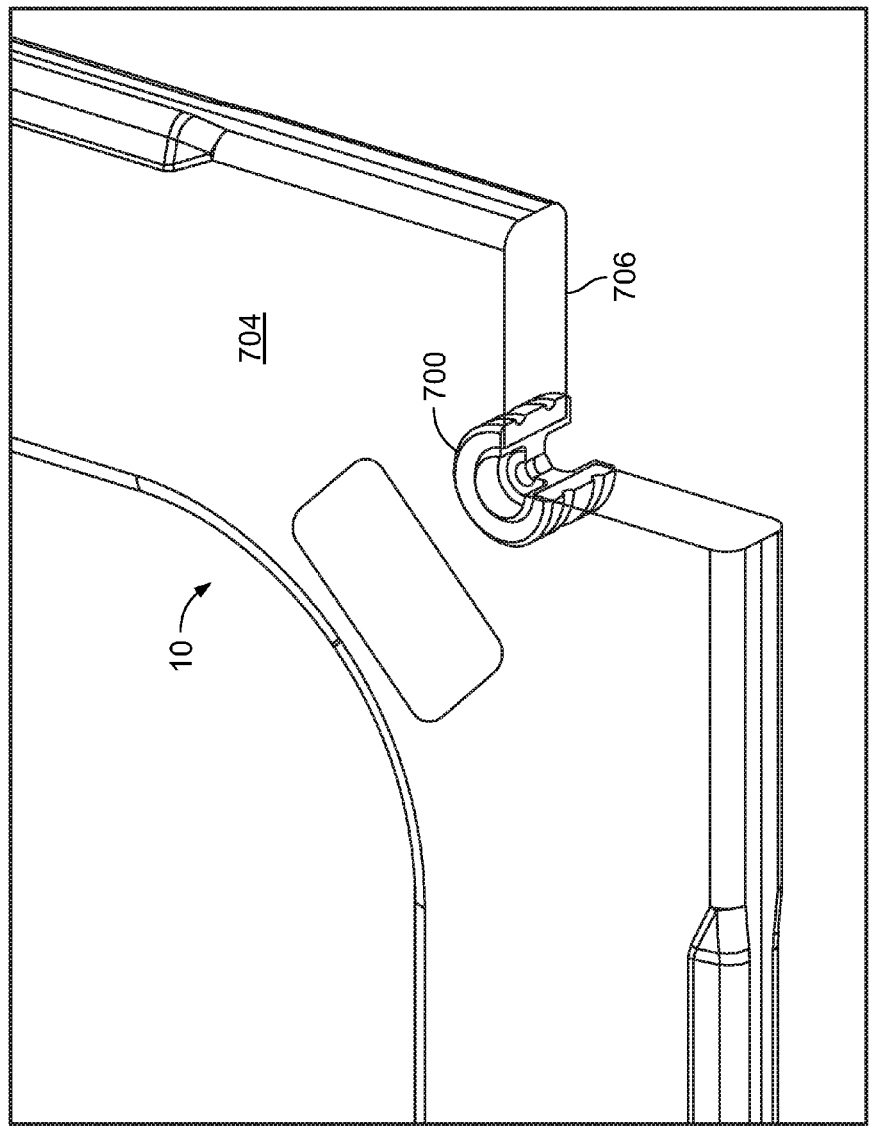
FIG. 25 is an enlarged sectional view of a top frame grommet in accord with an embodiment of the present invention.

As shown in FIGS. 24 and 25, the grommets 700 extend above and below top and bottom surfaces 704 and 706 of the top frame 100. The grommets 700 are located at any desirable location within the transport items. For example, in the top frame 100 embodiments shown, the grommets 700 can further be located such that when top frames 100 are stacked, the grommets 700 of the top frame 100 contact grommets 700 above and below it. This provides separation between top frames 100 when stacked one upon the other. In other embodiments, the grommets 700 are located such they are compatible with automated packaging or other equipment with which the top frame 100 will be used. When used with other transport items, the grommets 700 can also be located within the pallet support board 10, pallet 200, tote 400 or dolly 500 such that they are compatible with items that will be placed upon or within them.

The grommets 700 can be made from rubber, urethane, or any suitable material. It is preferred that grommets 700 be made of a material having a higher coefficient of friction than the transport item material. It is also preferred that the grommet 700 be made of a material that will adhere or bond chemically or otherwise to the transport item material such that it is not easily dislodged therefrom. However, it is recognized that in certain applications it might be desirable that the grommets 700 have a lesser or equal coefficient of friction than the transport item material, and that the grommets 700 be easily removable from or rotatable within the transport item.

Figure 31:
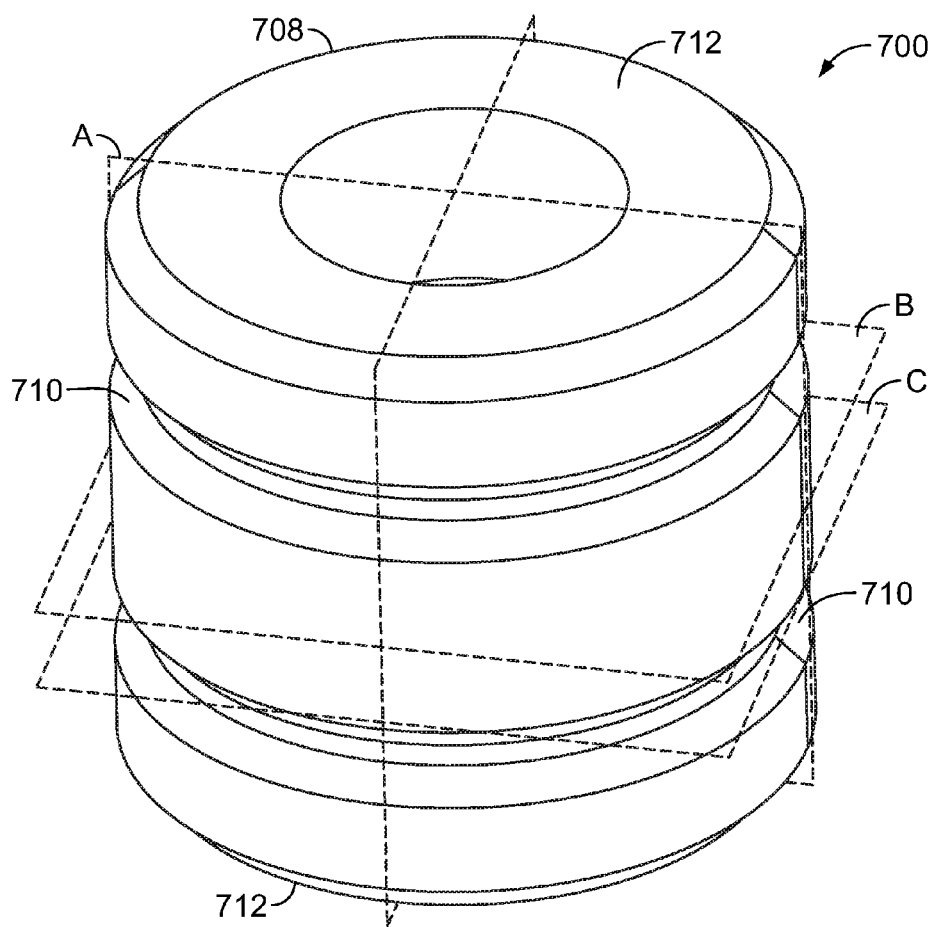
FIG. 31 is a perspective view of a grommet in accord with an embodiment of the present invention.
Figure 32:
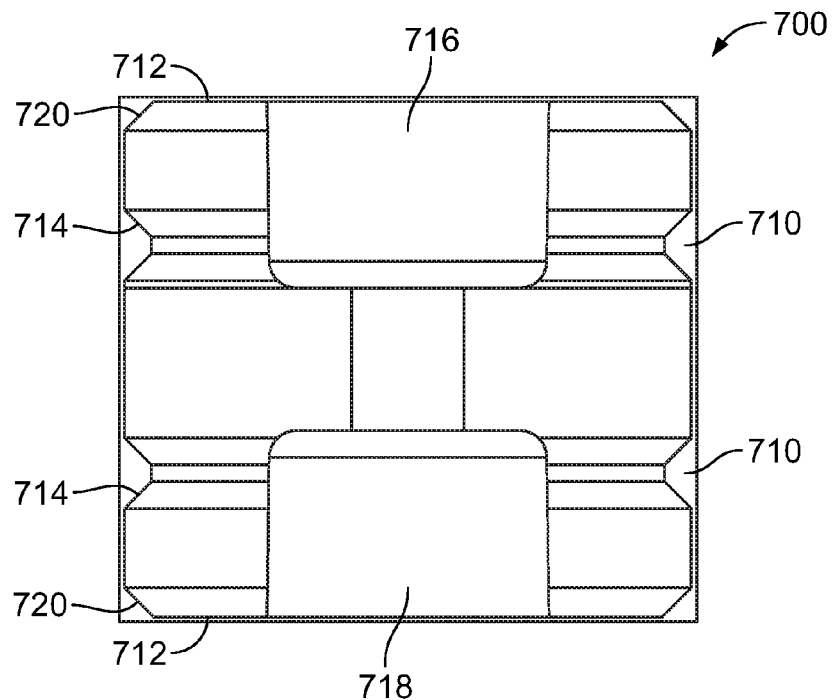
FIG. 32 is a front view a grommet taken along plane A of FIG. 31.
Figure 33:
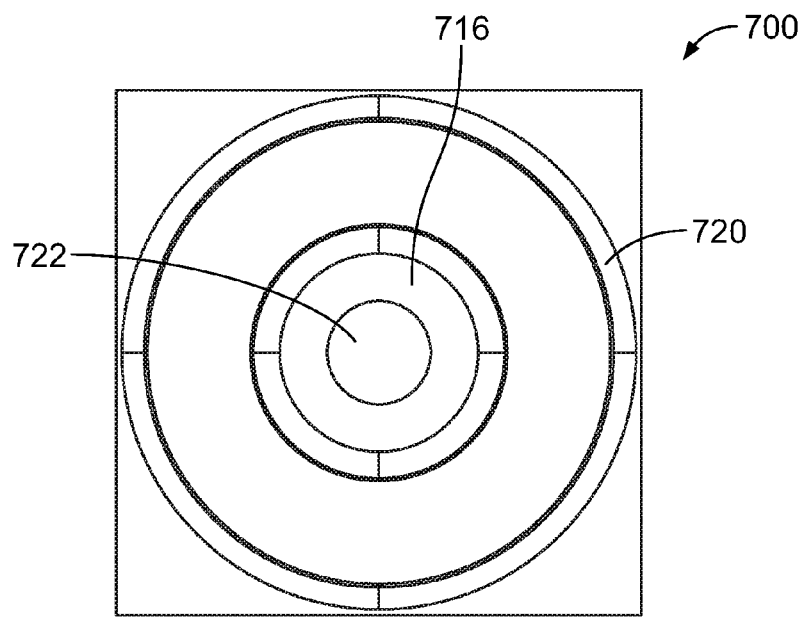
FIG. 33 is a top view of a grommet taken along plane B of FIG. 31.

The grommets 700 can be made of any desirable shape such as a round or squared cylinder. In the embodiment of FIGS. 31-33, the grommet 700 is a round cylinder 708. FIG. 31 shows planes A, B, and C intersecting the grommet 700. The cylinder 708 includes a pair of grooves 710 disposed towards either end 712 of the grommet 700. The grooves 710 include inwardly sloping sides 714. The angle of slope of the sides 714 is on the order of at minimum five degrees draft. The depth of the grooves 710 is preferably on the order of 0.03 inches to 0.25 inches. This range of angle and depth has been shown to adequately secure the grommet 700 within the top frame 100. Other depths and angles may be used depending on the amount of mechanical securing desired. The angles and depths must also be chosen so as not to create abrupt angles that rather than securing the grommet 700 within the transport item, due to the brittleness of the thermoset foam material, would tend to break the material.

The grommet 700 also has cylindrical openings 716 and 718 at either end 712. A through hole 722 is located in the center of the grommet 700. The openings 716 cooperate with mold 800 to locate the grommets within the mold 800 and within the top frame 100 as described below. The grommet 700 includes at its ends 712 a slope portion 720. At least part of the sloped portion 720 extends above and below the outer surfaces 704 and 706 of the top frame 100 as shown in FIGS. 24 and 25.

Figure 26:
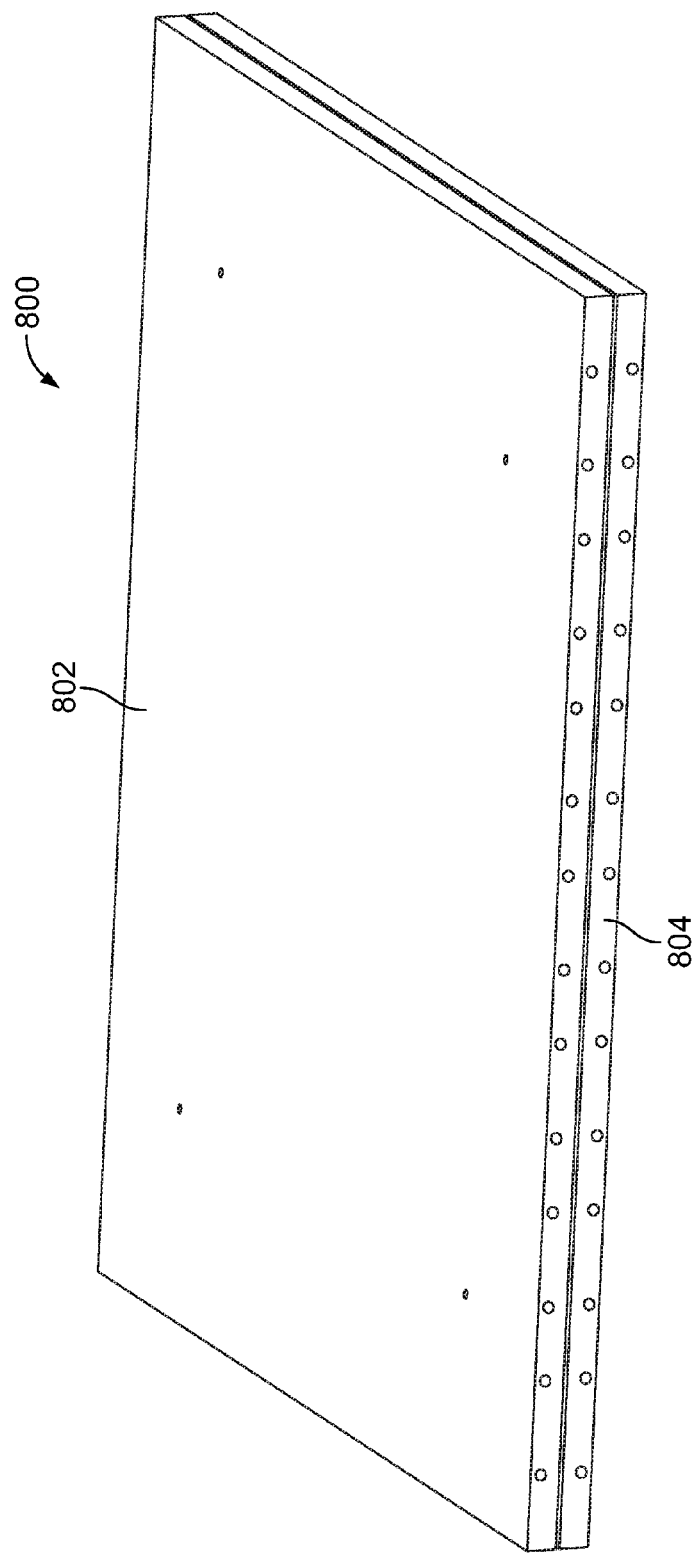
FIG. 26 is perspective view of a mold for a top frame in accord with an embodiment of the present invention.
Figure 27:
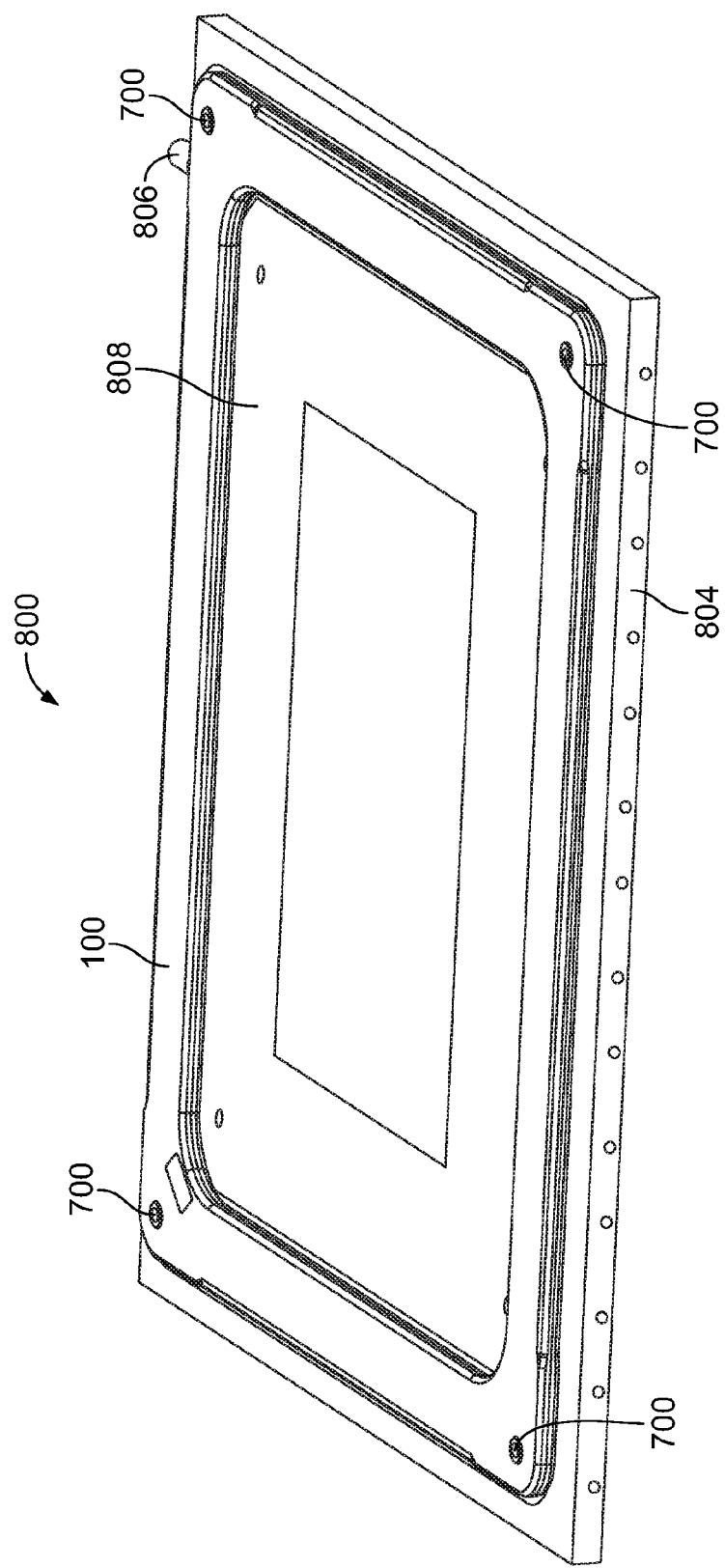
FIG. 27 is a perspective view of a top frame within a mold in accord with an embodiment of the present invention.
Figure 28:
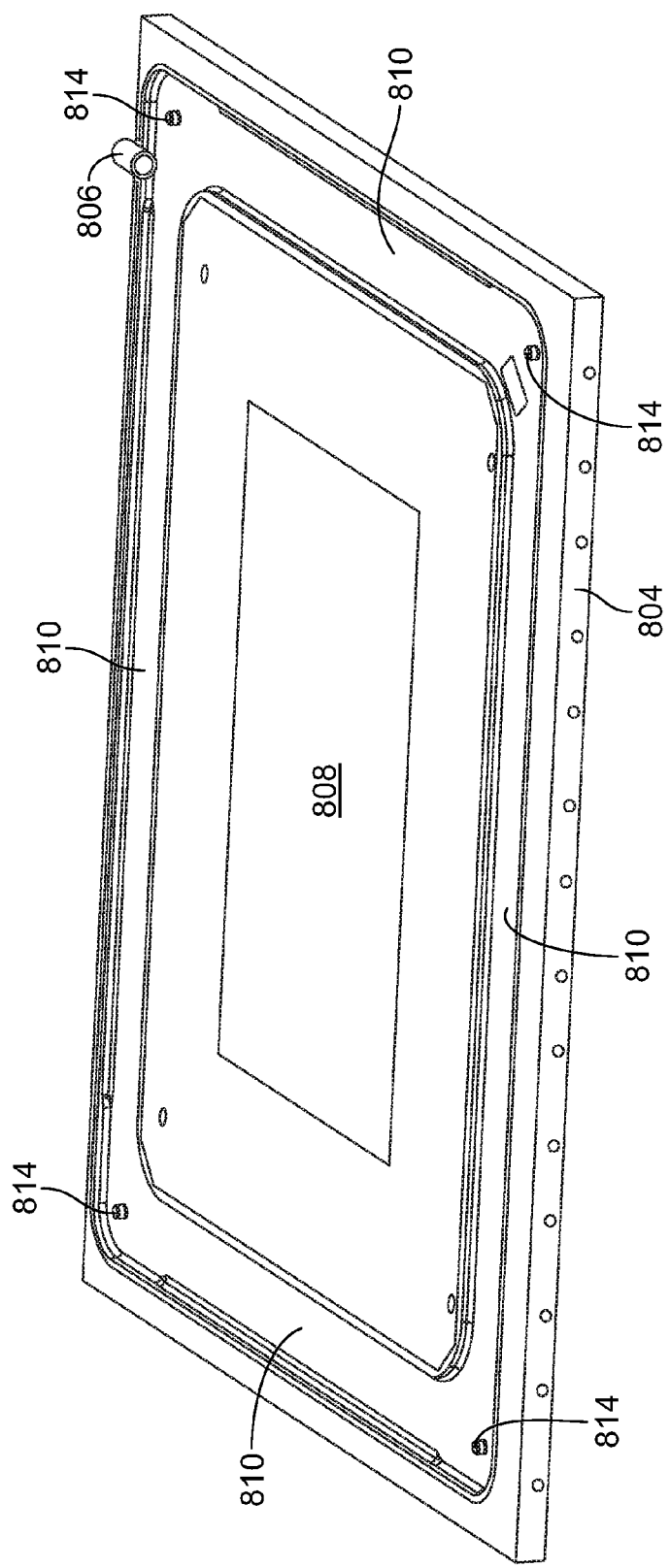
FIG. 28 is a perspective view of a bottom portion of a mold in accord with an embodiment of the present invention.
Figure 29:
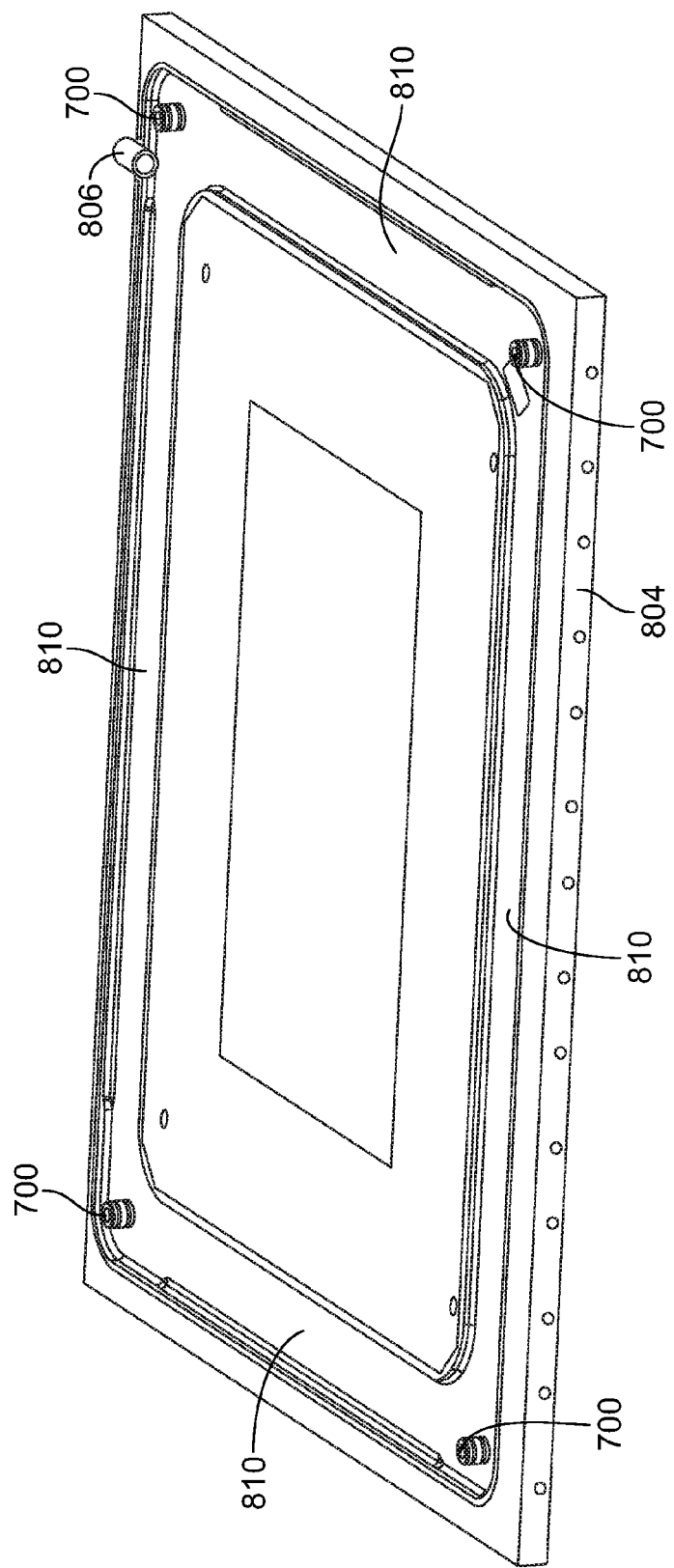
FIG. 29 is a perspective view of a bottom portion of a mold with grommets in accord with an embodiment of the present invention.
Figure 30:
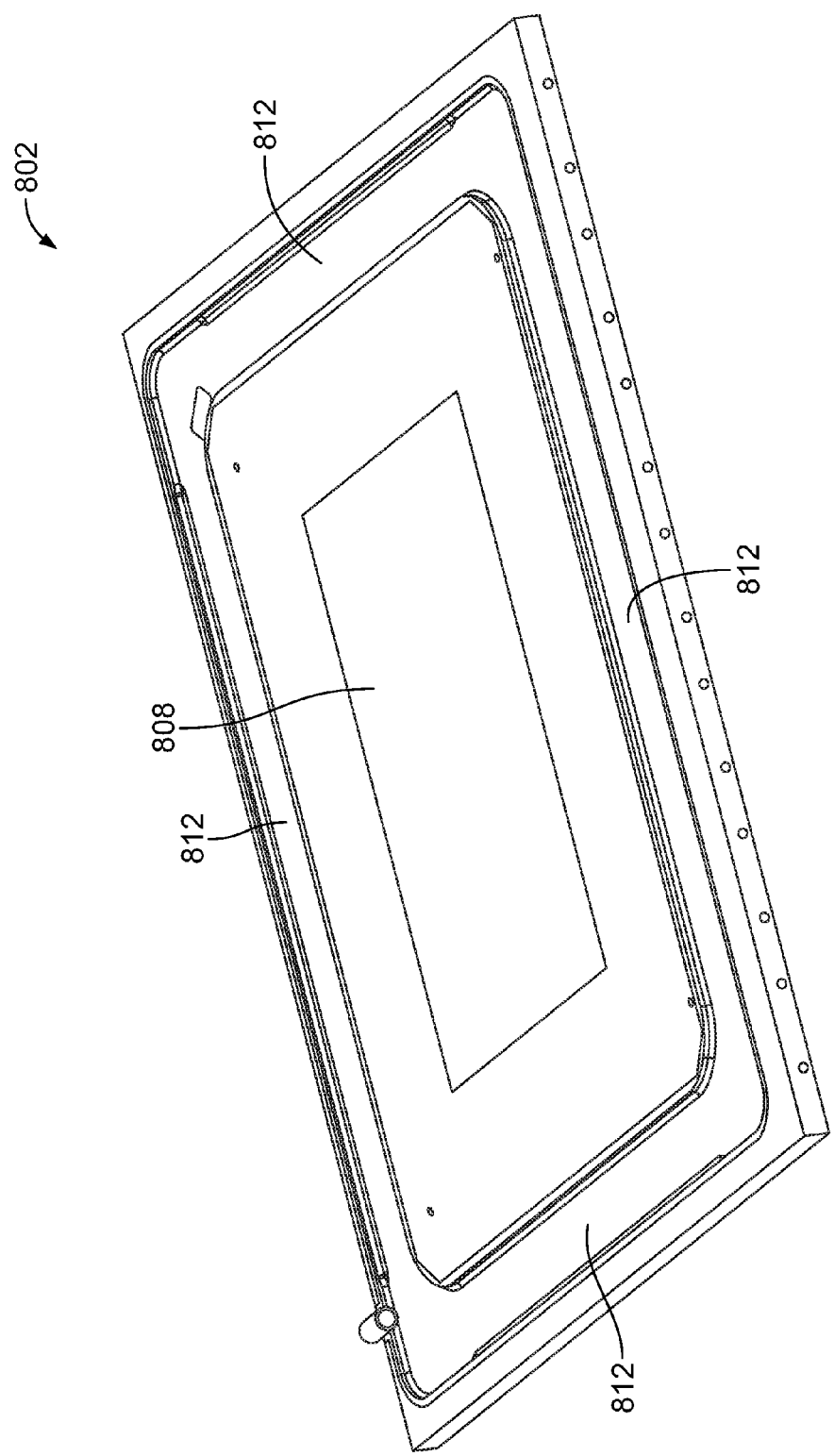
FIG. 30 is a perspective view of a top portion of a mold in accord with an embodiment of the present invention.

An example of integrating the grommets within a transport item is shown in FIGS. 26-30. FIG. 26 shows a mold 800 for forming a top frame 100 including grommets 700. The mold 800 includes a top portion 802 and a bottom portion 804. The mold 800 is preferably made of metal such as steel or aluminum, but any suitable material can be used. The mold 800 also includes a nozzle 806 into which thermoset foam components are injected. The nozzle 806 communicates with the interior 808 of the mold 800. The bottom portion 804 of the mold 800 includes a top frame bottom forming area 810 that corresponds to the shape of bottom portion of the top frame 100. The top portion 802 includes a top forming area 812 that corresponds to the shape of the top portion of the top frame 100. The forming areas 810 and 812 can include a texturized surface to create a texturized surface on the finished top frame 100.

Within the bottom forming area 810 are a plurality of pegs 814. The grommets 700 are placed on pegs 814 (FIGS. 28 and 29) such that the pegs 814 are inserted into openings 716 or 718 to locate the grommets 700 within the mold 800 and within the finished top frame 100. Pegs 814 may also be included on the top portion 802. Note that the grommet is actually compressed down when the mold 800 is closed. In the top frame 100 application, the mold space in one embodiment is on the order of 1.0" and the grommet is 1.125" tall. This "seals" the foam material from getting on top of the grommet 700 as well as determines how much the grommet 700 protrudes above and below the other surfaces 704 and 706. The grommets 700 may protrude above both the top and bottom surfaces 704 and 706 of the top frame 100, or one or the other of these surfaces as desired. The protrusion allows the grommet 700 to contact items upon with the top frame 100 is placed, or to contact other grommets 700 when in use.

FIGS. 34-38 show the grommets 700 used with a tote 400. The grommets 700 are located within one or both of the lid 406 or tote bottom 440. The grommets 700 can extend above one or both of the upper and lower surfaces 442 and 444 of the lid 406 or 446 and 448 of the bottom 440.

Figure 39:
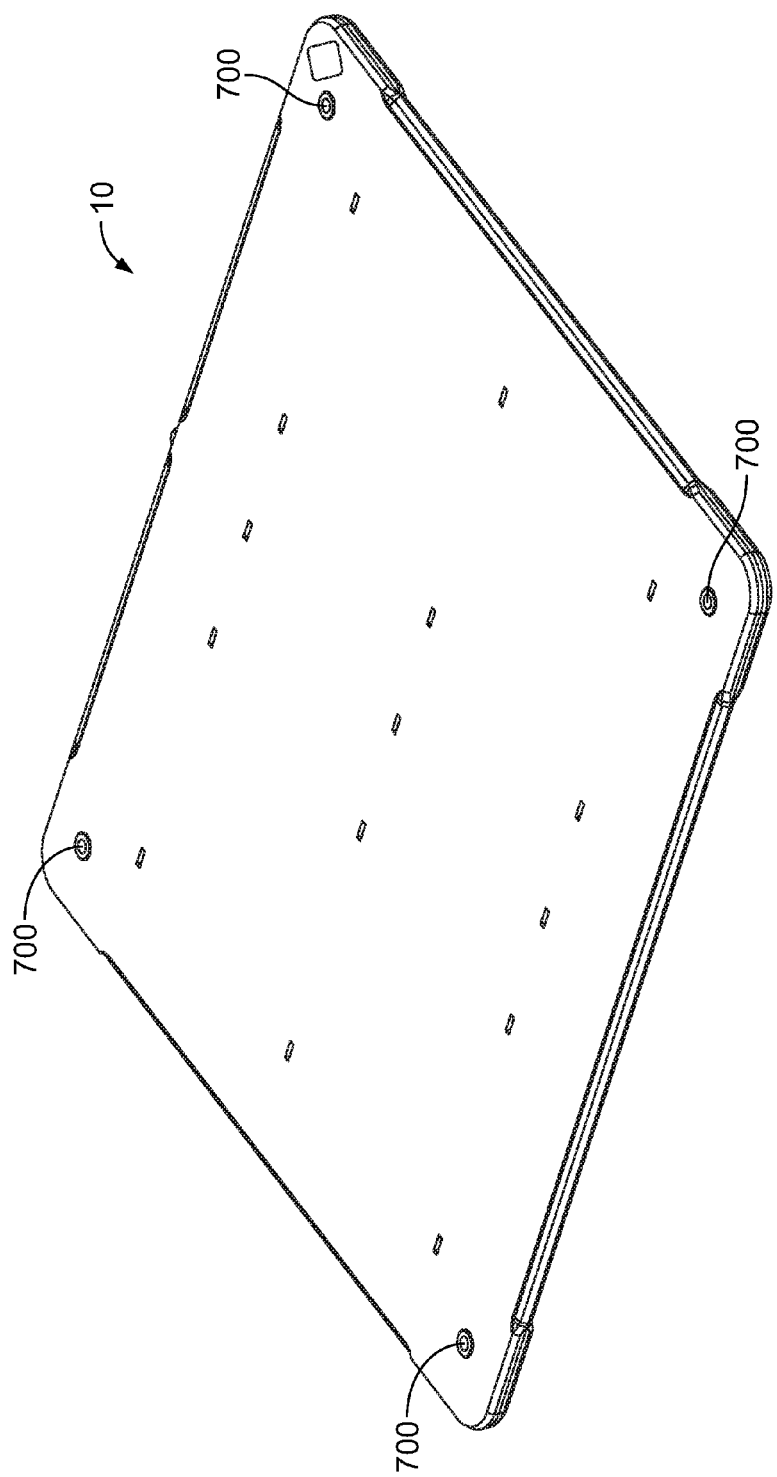
FIG. 39 is a perspective view of a pallet support board in accord with an embodiment of the present invention.

FIG. 39 shows grommets 700 within a pallet support board 10. The same principles described above with respect to top frames 100 and totes 400 apply to use of grommets 700 in the pallet support board 10, as well as any other desired transport item.

While the invention has been particularly described with respect to pallet support boards, top frames, pallets, dollies, and totes, the invention may also be used with other materials used to transport and store goods and materials, including top caps, bulk bins, or other suitable applications. Many of these items will be in one piece with each of the components integrally connected or formed with the other components.

Figure 40:
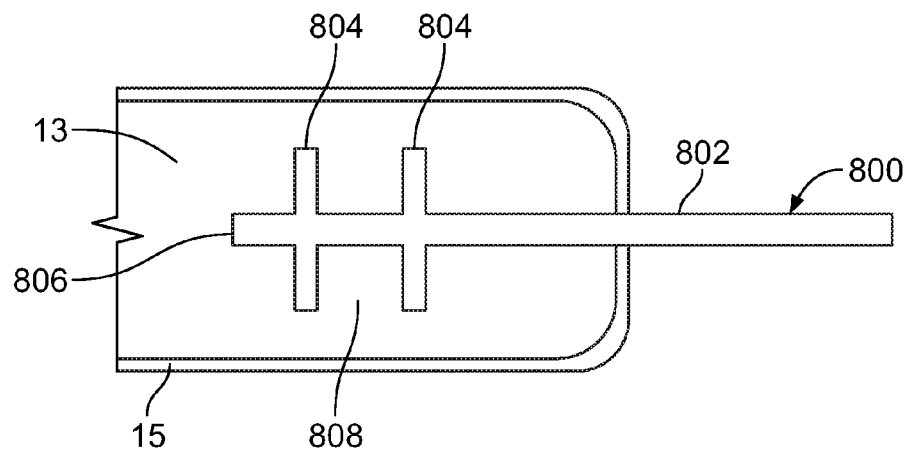
FIG. 40 is a side sectional view of a pallet board with a gripper insert in accord with an embodiment of the present invention.
Figure 41:
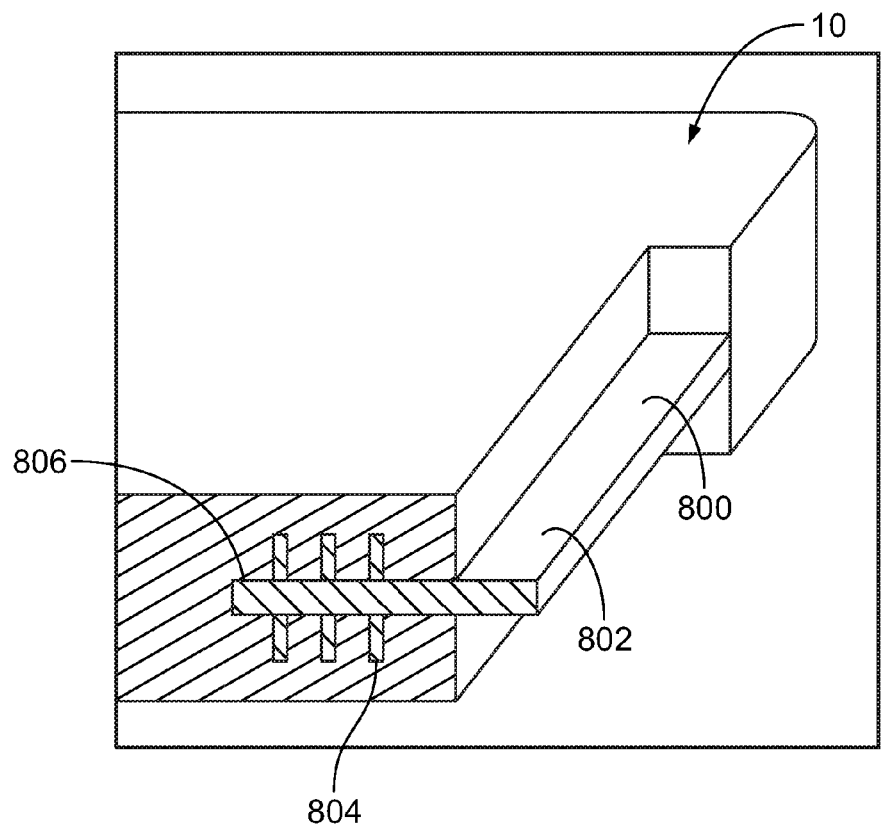
FIG. 41 is a perspective sectional view of a pallet board with a gripper insert in accord with an embodiment of the present invention.

FIGS. 40 and 41 show a gripper insert 800 within a pallet support board 10. The gripper 800 includes a generally planar portion 802. The gripper 800 can be made of any suitable material, include thermoplastic. Perpendicular to the planar portion 802 are a plurality of parallel fingers 804 located toward a first end 806 of the planar portion 802. The fingers 804 are located and molded within the pallet support board 10. The thermoset foam material of the pallet support board 10 fills interstices 808 between the fingers 804 to secure the gripper 800 within the board 10. The gripper 800 can also be any desired shape outside the body of the pallet support board 10 that would be suitable to its purpose.

While the specific embodiments have been illustrated and described, numerous modifications come to mind without significantly departing from the spirit of the invention and the scope of protection is only limited by the scope of the accompanying Claims.

I claim:

1. A transport item for shipping goods comprising:
   a body having first outer surface and a second outer surface, and a thickness therebetween, the body formed from a thermoset foam material varying in density along the body thickness such that the density of the thermoset foam material is greatest nearest the outer surface; and
   a first insertable component having a first portion located within the thickness of the body and a second portion that extends outside of the body beyond the first outer surface.

2. The transport item of claim 1 wherein the first insertable component is a grommet.

3. The transport item of claim 2 wherein the grommet is made of one of rubber and plastic.

4. The transport item of claim 1 wherein the first insertable component includes a circumferential groove for mechanically securing the component into the foam material.

5. The transport item of claim 1 wherein at least a part of the body has an exterior skin with a texturized surface.

6. The transport item of claim 1 wherein first insertable body includes at least one reinforcing material selected from the group consisting of fiberglass matting, fiberglass fiber, metal tubing, metal plating, plastic tubing, pultruded fiberglass rod, shaped metal, microballoons, nanomaterials, wood, polyester matting, and polyester fibers.

7. The transport item of claim 1 wherein the first insertable component is a caster.

8. The transport item of claim 1 wherein the first insertable component is a gripper.

9. The transport item of claim 1 wherein the first insertable component is a gasket.

10. The transport item of claim 1 wherein the transport item is a top frame, and the body includes a pair of substantially parallel side members, and a pair of substantially parallel end members connected to the side members to form a generally rectangular frame structure with a central opening, and the first insertable component is located within the frame structure.

11. The transport item of claim 1 wherein the transport item is a pallet support board.

12. The transport item of claim 1 wherein the transport item is a tote, and the body includes a tote body having a bottom, and opposing first and second side walls, and opposing first and second end walls, and the first insertable component is located within the tote body bottom.

13. The transport item of claim 12 wherein the body includes a tote lid, and the first insertable component is located within the tote lid.

14. The transport item of claim 1 wherein the transport item is a dolly, and the body is generally planar and has a top side and a bottom side, the top side adapted to support an item, the body also having first and second opposing side members, and first and second opposing end members extending between the opposing first and second side members forming a frame structure having a central opening in the body bordered by the frame structure, and a plurality of wheels extending from the bottom side of the body.

15. A transport item comprising a body having an outer surface against which an item to be transported contacts, the body having a thickness formed from a thermoset foam material varying in density along the body thickness such that the density of the thermoset foam material is greatest nearest the outer surface, and a first insertable component located within the body such that portion of the component extends beyond the thickness.

16. The transport item of claim 15 wherein the first insertable component is a grommet.

17. The transport item of claim 15 wherein the transport item is a top frame.

18. The transport item of claim 15 wherein the transport item is a tote.

* * * * *